(12) United States Patent  
Carmody et al.

(10) Patent No.: US 6,334,486 B1
(45) Date of Patent: Jan. 1, 2002

(54) DOWNHOLE FLOW CONTROL DEVICES

(75) Inventors: Michael A. Carmody, Houston; Kevin R. Jones, Humble; Robert J. Coon, Houston; Douglas J. Murray, Humble; Mark E. Hopmann, Alvin; Steven L. Jennings, Friendswood; Brian A. Roth, Houston, all of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/706,526

(22) Filed: Nov. 3, 2000

Related U.S. Application Data

(62) Division of application No. 09/175,979, filed on Oct. 20, 1998, now Pat. No. 6,260,616, which is a division of application No. 08/831,165, filed on Apr. 1, 1997, now Pat. No. 5,906,238.

(60) Provisional application No. 60/014,518, filed on Apr. 1, 1996, and provisional application No. 60/014,644, filed on Apr. 1, 1996.

(51) Int. Cl.7 .......................... E21B 34/06; E21B 34/16; E21B 43/12

(52) U.S. Cl. ..................... 166/53; 166/66; 166/66.4; 166/66.6; 166/113; 166/332.1; 166/334.4; 251/129.11; 251/248; 251/340

(58) Field of Search ................. 166/63, 66, 66.4, 166/66.6, 113, 250.01, 332.1, 332.4, 334.4, 373, 386; 251/129.11, 248, 340

(56) References Cited

U.S. PATENT DOCUMENTS

| | | | |
|---|---|---|---|
| 2,723,677 A | * | 11/1955 | Middleton et al. ... 166/332.1 X |
| 3,120,267 A | | 2/1964 | Bayless |
| 3,338,310 A | | 8/1967 | McGill |
| 3,353,605 A | | 11/1967 | Garrett et al. |
| 3,490,732 A | | 1/1970 | Leroy |
| 3,494,588 A | | 2/1970 | Kisling, III |
| 4,022,273 A | * | 5/1977 | Marathe ................ 166/66.4 |
| 4,044,834 A | | 8/1977 | Perkins |
| 4,372,390 A | * | 2/1983 | Baugh et al. ............. 166/373 |
| 4,373,582 A | | 2/1983 | Bednar et al. |
| 4,560,005 A | * | 12/1985 | Helderle et al. ......... 166/332.2 |
| 4,671,356 A | * | 6/1987 | Barker et al. ............ 166/386 |
| 4,691,778 A | | 9/1987 | Pyne |
| 4,757,859 A | | 7/1988 | Schnatzmeyer |
| 4,796,708 A | | 1/1989 | Lembeke |
| 4,846,272 A | | 7/1989 | Leggett |
| 4,915,168 A | | 4/1990 | Upchurch |

(List continued on next page.)

FOREIGN PATENT DOCUMENTS

| | | |
|---|---|---|
| EP | 0 020 155 A1 | 12/1980 |
| EP | 0 065 601 | 12/1982 |
| EP | 0 594 390 A2 | 4/1994 |
| EP | 0 701 834 A1 | 3/1996 |
| EP | 0 233 750 A2 | 8/1997 |
| GB | 2 152 102 A | 7/1985 |
| GB | 2 232 178 A | 12/1990 |
| GB | 2 271 267 A | 4/1994 |
| GB | 2 291 904 A | 2/1996 |

Primary Examiner—George Suchfield
(74) Attorney, Agent, or Firm—Cantor Colburn LLP

(57) ABSTRACT

Several downhole flow control devices are disclosed which are meterable and are also capable of shutting of a particular zone in a well. The several embodiments include a multiple valve body, a toroidal inflatable valve, and a series of related choke systems. The downhole flow control choke mechanisms each include a downhole electronics package to provide programming or decision making capacity as well as motor actuation systems. Each choke mechanism also includes a system whereby the device can be converted to manual operation and actuated by a conventional shifting tool.

29 Claims, 45 Drawing Sheets

U.S. PATENT DOCUMENTS

| | | |
|---|---|---|
| 4,942,926 A | 7/1990 | Lessi |
| 4,969,513 A | 11/1990 | Barrus et al. |
| 5,038,862 A | 8/1991 | Giroux et al. |
| 5,048,611 A * | 9/1991 | Cochran ................. 166/386 X |
| 5,137,255 A * | 8/1992 | Sumida et al. ...... 251/129.11 X |
| 5,186,255 A | 2/1993 | Corey |
| 5,205,325 A | 4/1993 | Piper |
| 5,226,491 A * | 7/1993 | Pringle et al. ......... 166/66.4 X |
| 5,299,640 A | 4/1994 | Streich et al. |
| 5,318,130 A | 6/1994 | Manke |
| 5,429,609 A | 7/1995 | Yoon |
| 5,443,124 A | 8/1995 | Wood et al. |
| 5,465,787 A | 11/1995 | Roth |
| 5,531,270 A | 7/1996 | Fletcheter et al. |
| 5,558,153 A * | 9/1996 | Holcombe et al. .......... 166/373 |
| 5,597,042 A | 1/1997 | Tubel et al. |
| 5,662,165 A | 9/1997 | Tubel et al. |
| 5,682,952 A * | 11/1997 | Stokley ...................... 166/373 |
| 5,979,558 A * | 11/1999 | Bouldin et al. ............. 166/373 |

\* cited by examiner

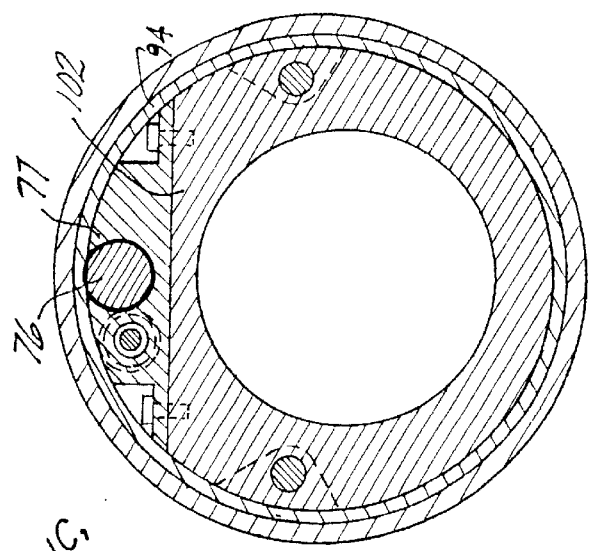
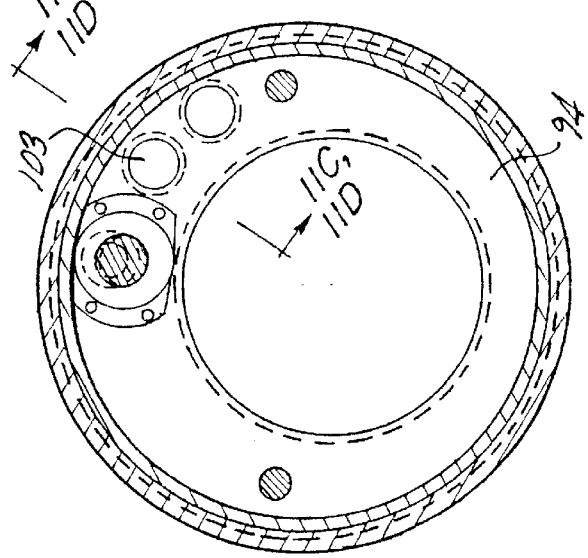
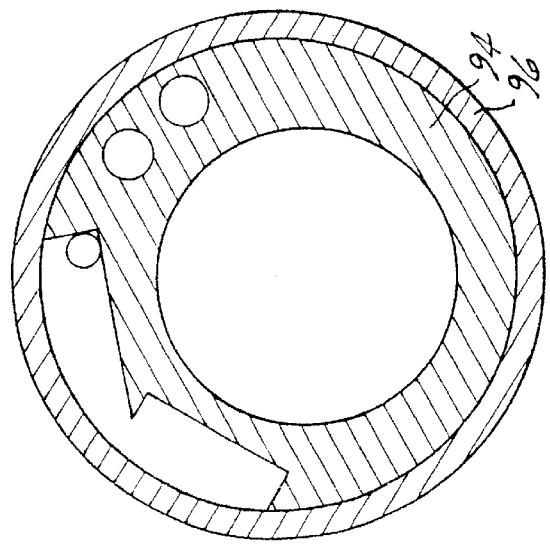
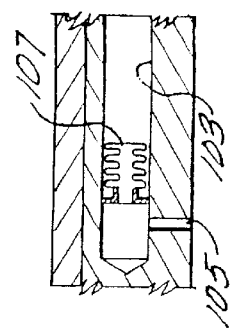
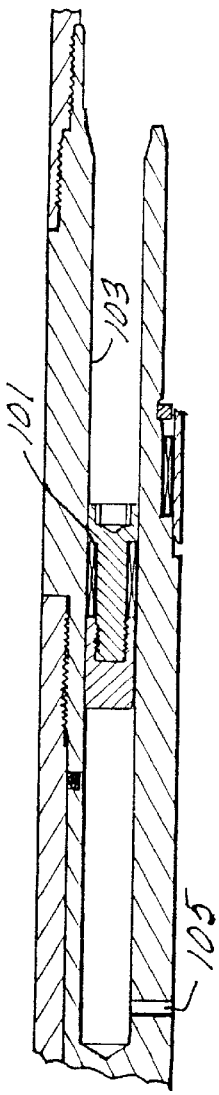

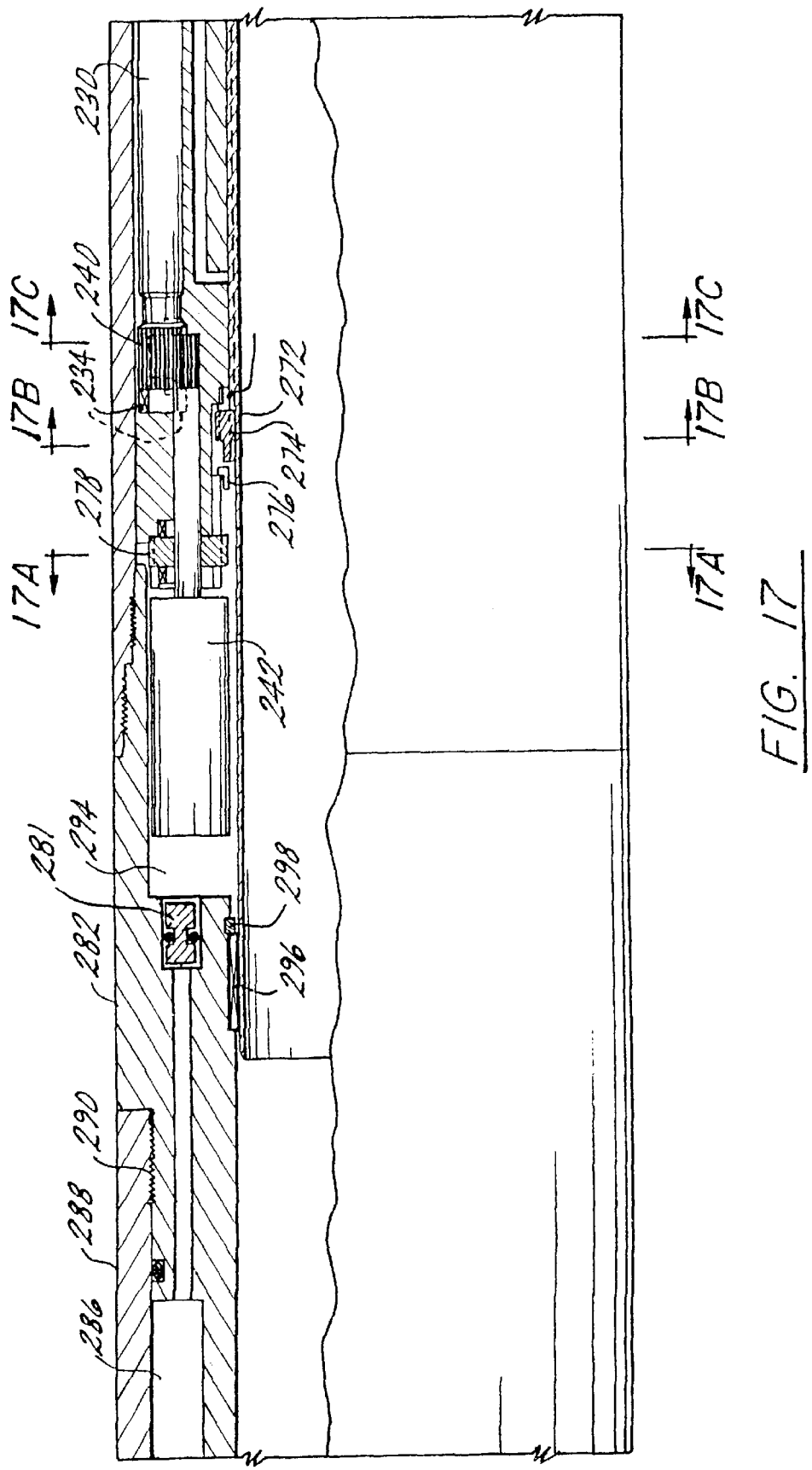

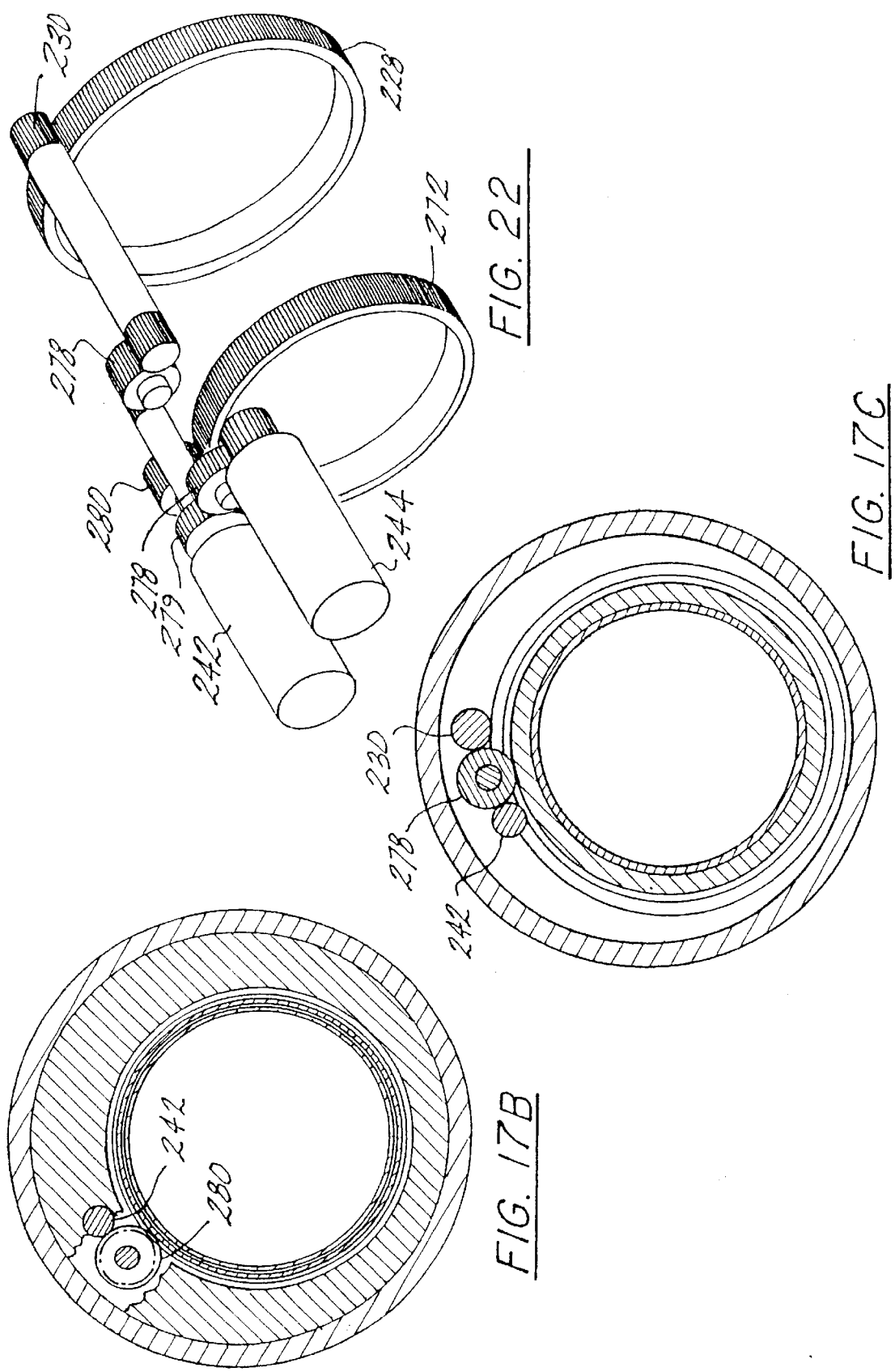

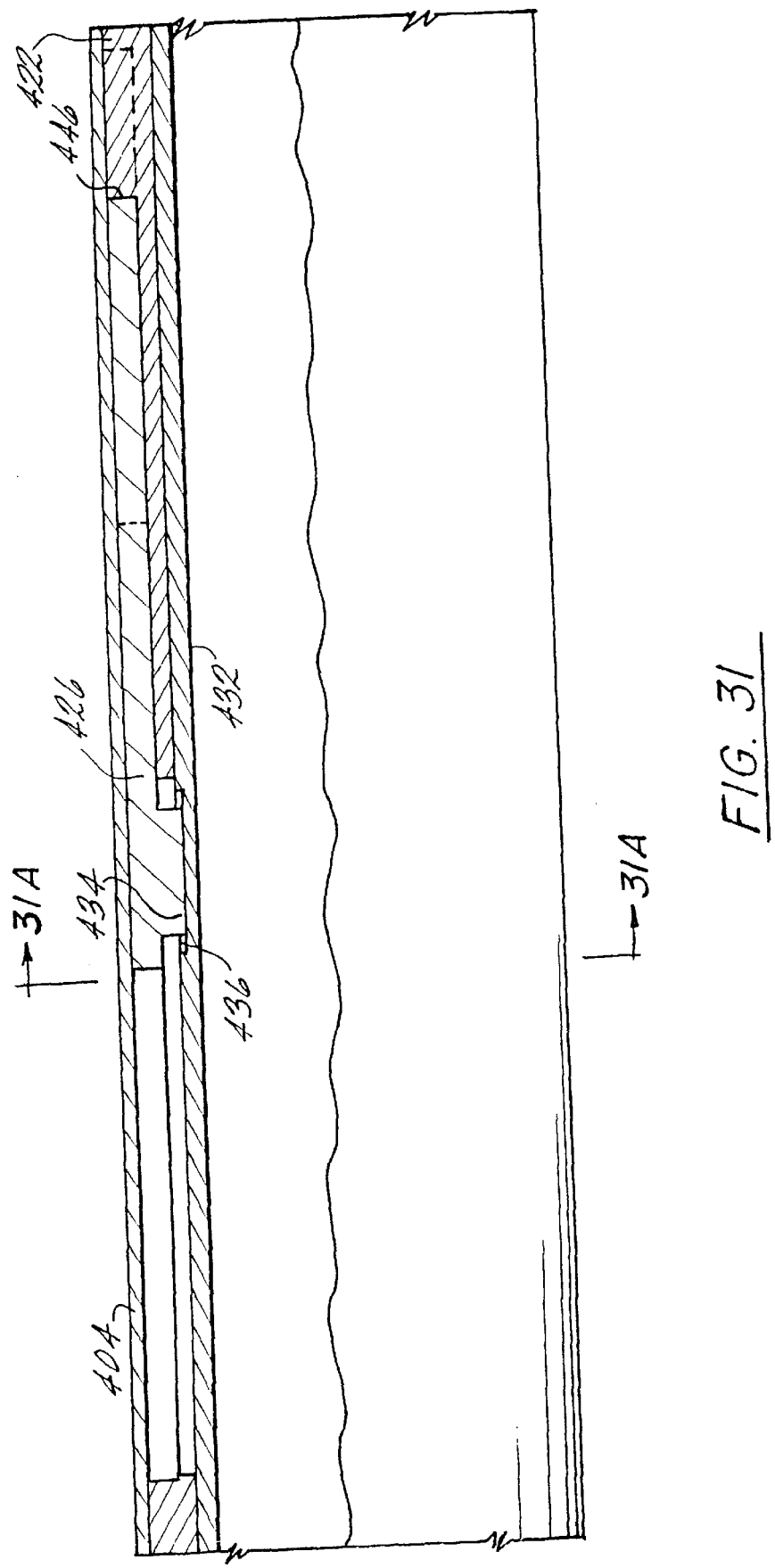

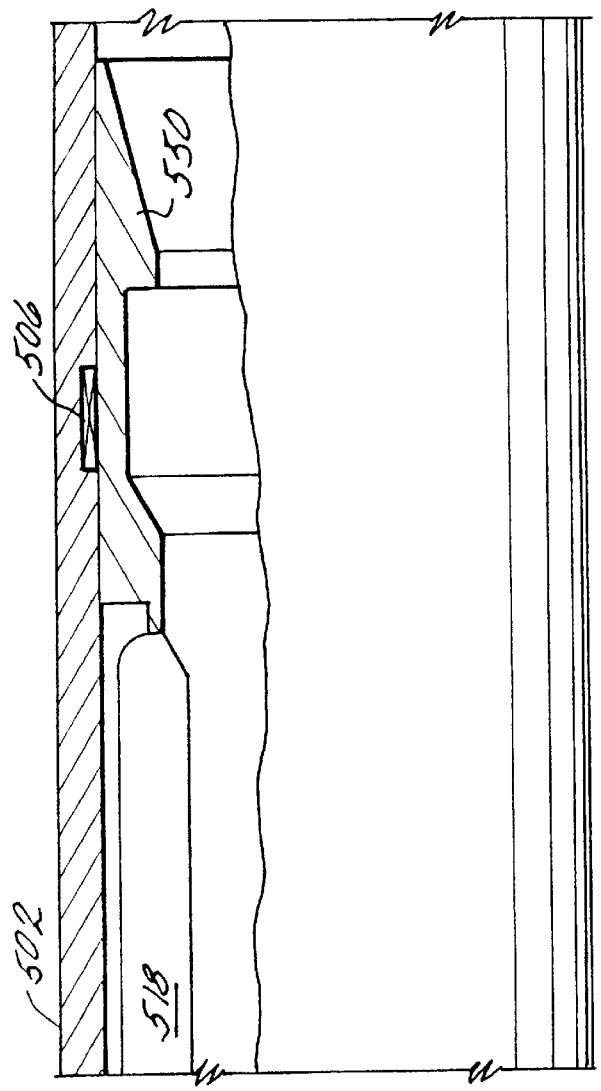
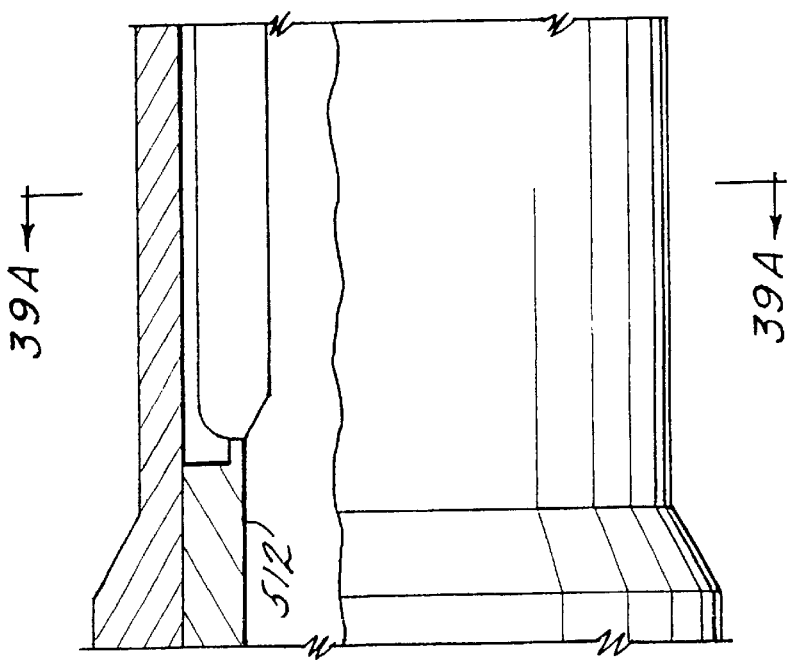
FIG. 39

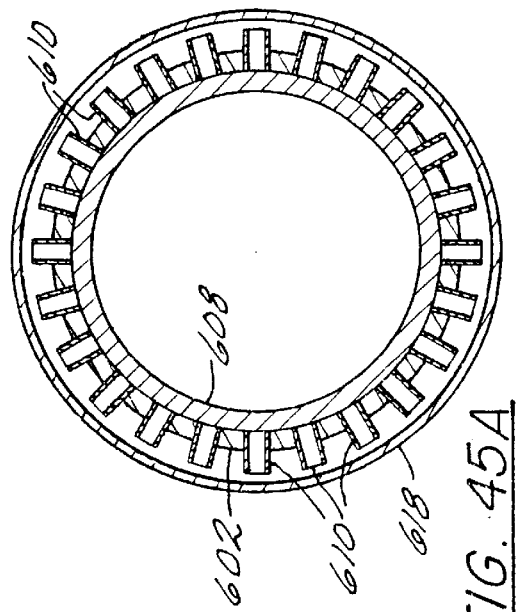
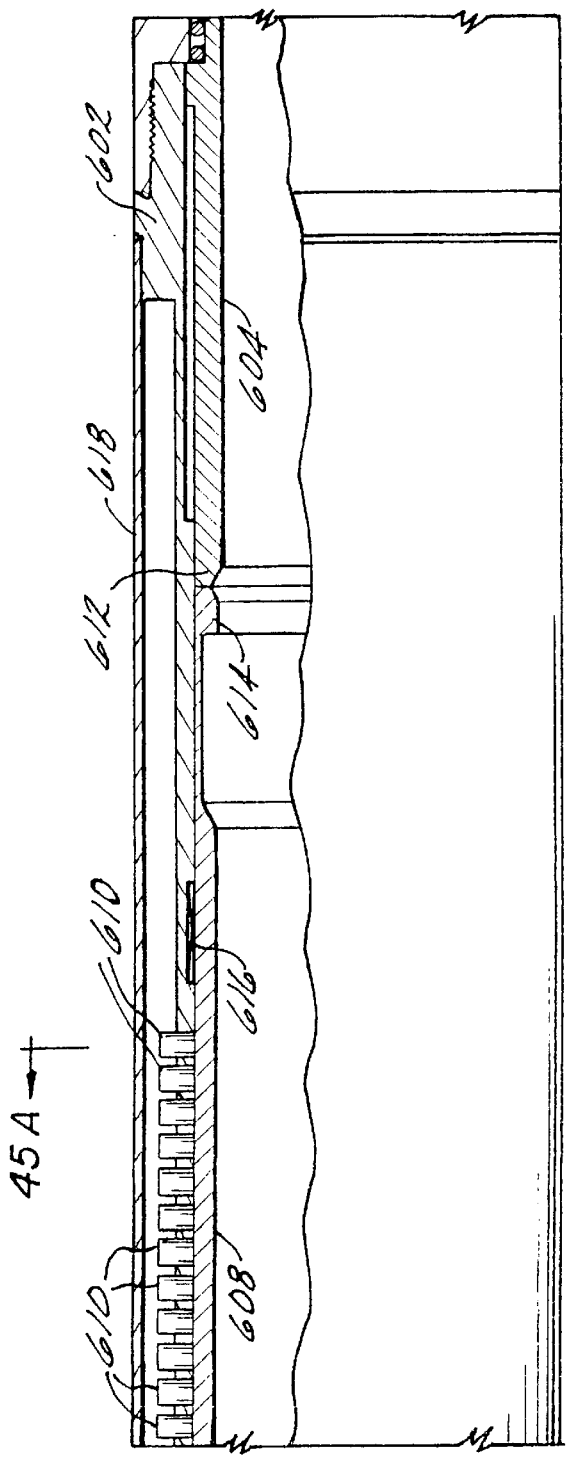
FIG. 45
FIG. 45A

DOWNHOLE FLOW CONTROL DEVICES

This is a divisional of U.S. Ser. No. 09/175,979, filed Oct. 20, 1998, now U.S. Pat No. 6,260,616, which is divisional of 08/831,165, filed Apr. 1, 1997, now U.S. Pat. No. 5,906,238 which claims the benefit of an earlier filing date from Ser. Nos. 60/014,518 and 60/014,644 filed Apr. 1, 1996.

BACKGROUND OF THE INVENTION

1. Field of the Invention

The invention relates to oil well technology. More particularly, the invention relates to a downhole fluid flow and pressure equalization control and choke devices.

2. Prior Art

Flow control has been a concern of the oil drilling industry since the first well produced a gusher like that of spindle top in Texas on Jan. 10, 1901. Initially, flow control was focused upon surface based apparati, however, as technology advanced and multiple production zone/multiple production fluid wells grew in popularity, flow control downhole has become increasingly important.

One particular prior art device which has been very effective is the CM sliding sleeve commercially available from Baker Oil Tools, 6023 Navigation Boulevard, Houston Tex. 77011. The sleeve employs one outer housing with slots and one inner housing with slots. The slots are alignable and misalignable with axial movement of the inner housing relative to the outer housing. The tool is effective for its intended purpose but does not provide any selectivity regarding where on the circumference flow is desired. Other valving and choking devices are also available in the prior art but there is still a need for more efficient devices and specific devices to function where others have not proved effective. Moreover, devices which function with less or no input from the surface are also likely to have a significant positive impact on the industry.

SUMMARY OF THE INVENTION

The above-discussed and other drawbacks and deficiencies of the prior art are overcome or alleviated by the downhole flow control devices of the invention.

In connection with all of the following embodiments and sub embodiments of the invention it will be understood that these include (although could be employed without) downhole electronics including processors, sensors, etc., in the downhole environment which perform decision making tasks based upon input from sensors and or from preprogramming and or from surface input. These intelligent systems are more fully discussed in U.S. Pat. No. 5,597,042 which is assigned to Baker Hughes Incorporated who is the assignee hereof. The entire contents of U.S. Pat. No. 5,597,042 is incorporated hereby by reference.

In the first embodiment of the invention a cylindrical tool having a plurality or multiplicity of individual valve bodies is provided. The valve bodies are individually activatable to meter flow circumferentially around the tool. Among the individual valve bodies, three subembodiments are most preferred. In the first subembodiment each individual valve is arranged to be rotationally adjustable; in the second subembodiment, which is of very similar appearance to the fist, the valve is arranged to be adjustable to be longitudinally slidable; and the third subembodiment provides a conical/cylindrical spear valve and a conical/cylindrical mating structure which allows fluid to flow when the spear is not fully urged into the cone.

With all of the subembodiments of the first embodiment of the invention, metered control is possible as well as circumferential control. It will be understood that among the valve bodies, differing subembodiments may be assembled within one tool.

Actuation of the valve bodies of any of the subembodiments may be by way of electric motor, hydraulic or pneumatic pressurized flow or otherwise. Another feature of the invention is a downhole electronics package that allows for the downhole decision making sensing and powering of the downhole tools of the invention.

In a second embodiment of the invention, a toroidal inflatable/deflatable bladder is disclosed which provides a centrally located orifice through which fluid may flow when the bladder is not fully inflated thus occluding the orifice. An advantage of the device is that it is very versatile and is capable of a great many closing and opening cycles in varying degrees without failure.

In a third embodiment of the invention a dependent sleeve choke mechanism is disclosed. The tool includes inner and outer sleeves which are disposed one on either of the inner and outer diameter of the housing of the tool. The inner and outer sleeves are fixedly connected to one another such that the sleeves move in tandem to conceal or reveal openings in the housing through which fluid may flow. Actuation may be by electric, hydraulic or pneumatic motor and a gear train or can be by conventional shifting tools. Position sensors are preferably employed to provide information regarding the position of the sleeve. Other sensors as disclosed in Baker Oil Tools U.S. Pat. No. 5,597,042 issued Jan. 28, 1997 which is assigned to the assignee hereof and incorporated herein by reference.

In a fourth embodiment of the invention, similar to the third embodiment, an independent sleeve choke mechanism is disclosed. In the independent mechanism, the inner and outer sleeves are not connected to one another and may be actuated independently of one another. Actuation may be by a single motor, solenoid switchable to the desired gear train or may be two motors independent of one another. The sensing or processing as discussed above are applicable to this embodiment as well.

In general, with respect to the above, position sensors such as linear potentiometers, linear voltage displacement transducers (LVDT) resolvers or a synchro is employed to determine position of either the dependent or independent sleeve choke devices. Moreover, in both the third and fourth embodiments, shear out mechanisms are provided in the event of failure of the powered actuation system so that the tool may be conventionally actuated with for example a shifting tool.

In a fifth embodiment of the invention, a nose seal choke mechanism is disclosed. The nose seal choke mechanism includes a moveable sleeve on the inside of a ported housing which regulates flow by obstructing the amount of port area open to flow. Flow is restricted by the unique stepped out nose on the inner sleeve. The mechanism provides an advantage by shielding seals from flow through the device. This is beneficial because it prevents seals being washed out or flow cut during operation of the choke mechanism. The device is actuatable by powered means or, if such means fail, by conventional means after shearing. This device also provides a dual back up operation by adding a second shear out mechanism and a second flow control.

A sixth embodiment of the invention is a helical key choke mechanism. This device includes helical grooves around the O.D. of a ported housing and keys set within the grooves that are moveable based upon the movement of a sleeve which is attached to the keys either directly or through an intermediary. By moving the keys into the helical flow path, flow is restricted; by moving the keys out of the flow path, flow can be increased. Preferably there are a total of four keys used so that the flow area is maximized through the annular area while stiff promoting accurate and substantial control of fluid. The inner sleeve, to which the keys are operably attached, is actuated by motors of electrical, hydraulic or pneumatic modes of operation or conventionally after shear out of the shear release sleeve.

In a seventh embodiment of the invention, a spiral choke mechanism is disclosed which enlarges or restricts port openings in a ported housing by rotation of a spiral choke device. Rotation of the choke device changes the throat opening between the ported housing and the port in the spiral choke. This enables reliable metering of the flow from the well annulus to the tubing string. Sensors are used to determine the position of the metering spiral choke device. Actuators for the device are similar to those discussed above, and a shear out structure is supplied for removing the powered actuator from contact with the choke device. In this embodiment the shifted operation is a one time permanent closure operation.

An eighth embodiment of the invention is an orifice choke mechanism wherein a moveable sleeve inside an orifice housing having a plurality of hard material orifices regulates fluid flow by obstructing number of orifices open to flow. In this embodiment the entry of the orifices is square edged to provide a pressure drop. The device is preferably actuated by a motor and gear train assembly which includes spur gears and a drive screw. A shear out mechanism is incorporated to allow the sleeve to be conventionally actuated in the event that the powered actuators should fail.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 9A is a cross-section view taken along section lines 9A—9A in FIG. 9;

FIG. 11A is a cross-section view taken along section lines 11A—11A in FIG. 11;

FIG. 11B is a cross-section view taken along section lines 11B—11B in FIG. 11;

FIG. 11C is a cross-section view taken along section lines 11C—11C in FIG. 11A;

FIG. 11D is a cross-section view taken along section lines 11D—11D in FIG. 11A;

FIGS. 17–21 represent a fourth embodiment of the invention wherein an inner and outer sleeves are not attached to one another;

FIG. 17B is a cross-section view taken along section lines 17B—17B in FIG. 17;

FIG. 17C is a cross-section view taken along section lines 17C—17C in FIG. 17;

FIG. 22 is a schematic perspective view of the drive mechanism of the fourth embodiment of this invention;

FIGS. 28–34 illustrate a helical key choke mechanism of the invention;

FIGS. 37–41 depict an elongated view of a spiral choke embodiment of the invention;

FIGS. 42–46 illustrate an elongated view of another embodiment of the invention providing an orifice choke mechanism; and FIG. 45A is a cross-section view of the invention illustrated in FIGS. 42–46 taken along section lines bearing same number, letter combination.

DETAILED DESCRIPTION OF THE PREFERRED EMBODIMENTS

Figure 1:
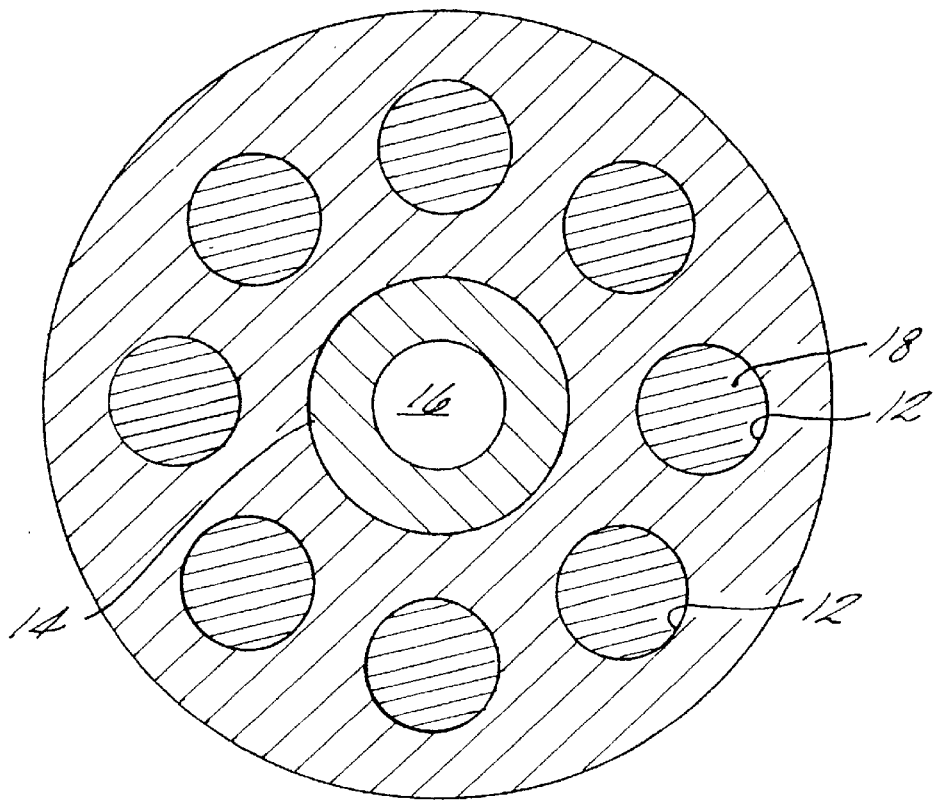
FIG. 1 is a cross section view of the multiple valve body flow control device of the invention.
Figure 5:
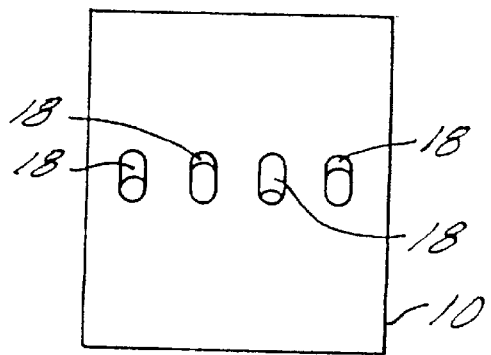
FIG. 5 is a side view of the tool of the invention illustrating the windows in the outer sleeve and the valves visible through the windows.
Figure 6:
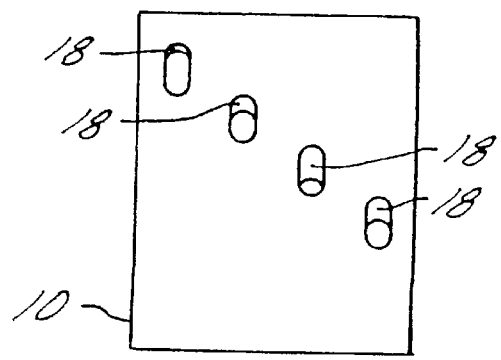
FIG. 6 is a side view of the invention with the windows illustrated in a staggered pattern.

Referring to FIG. 1, one of skill in the art will appreciate that the tool comprises outer housing 10 having a plurality or multiplicity of valve body bores 12 (could also be a single valve body bore if desired) which bores 12 are arranged preferably annularly around an inner sleeve 14 and an axial void 16. Brief reference to FIGS. 5 and 6 will put the tool in perspective for those of skill in the art. It will be appreciated that FIGS. 5 and 6 are examples of locations and patterns for windows and that other patterns and locations are possible and are within the scope of this invention.

The individual valve bodies 18, discussed more fully hereunder as 18a, 18b and 18c, are operated together, individually, or in selected subgroups to access and flow desired fluid from desired regions within a zone. The actuation of the valve bodies may be by electric motor (whether regular or a stepper motor), hydraulic or pneumatic systems, solenoid systems whether a single solenoid is employed for all of the valves or each valve has its own solenoid, etc. power can be supplied by an uphole or surface source or a downhole source and may be batteries, capacitors, TEC wire, etc. Complexity of the system desired will dictate whether all of the bodies 18 be actuated at once with a single actuator or if individual or groups be actuated which will require additional actuating systems or at least bridging systems within the tool. Multiple systems may be staggered to provide sufficient room within the tool.

Decision making with regard to openness of a particular body 18 or group if the same may be made downhole employing downhole intelligence technology like that disclosed in Baker Oil Tools U.S. Pat. No. 5,597,042 issued Jan. 28, 1997 previously incorporated herein by reference. ¼ inch TEC cable is a preferable conductor although any conductor may be employed to conduct signals and power to the actuators from a downhole intelligence system or from the surface.

Figure 2:
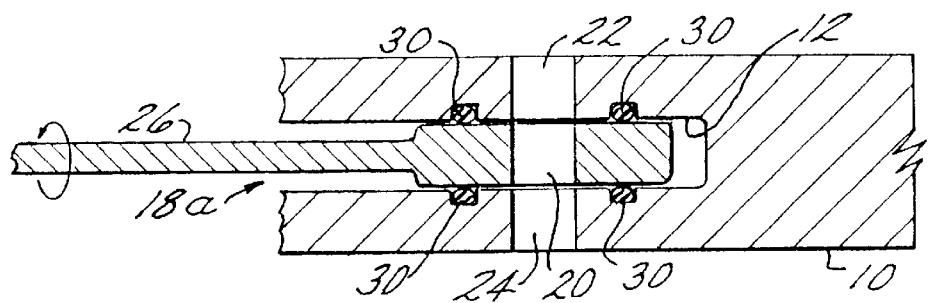
FIG. 2 is a transverse section of an individual rotary valve body structure of the invention.
Figure 3:
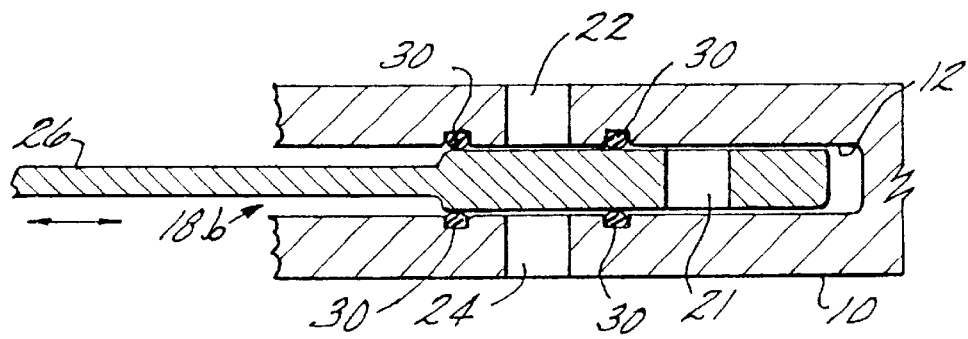
FIG. 3 is a transverse section of an individual sliding valve body structure of the invention.
Figure 4:
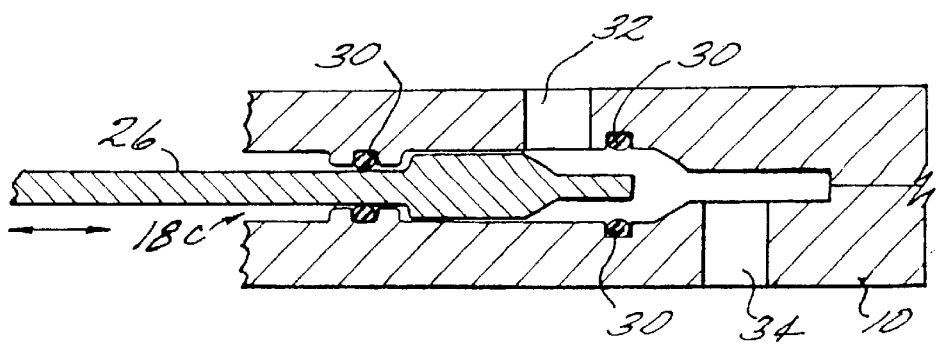
FIG. 4 is a transverse section of an individual conical/cylindrical valve body structure of the invention.

Referring to FIGS. 2–4 the embodiments of the individual valve bodies are illustrated. In FIG. 2, the bore 12 is the shallowest of the embodiments since no longitudinal movement of valve body 18a is necessary. Rather, in this embodiment the body 18a is in the form of a petcock having a fluid aperture 20 which is alignable or misalignable to a varying degree with external window 22 leading to the downhole environment and internal window 24 leading to the axial void 16 of the tool. The alignment of the petcock body 18a is accomplished by rotating body 18a through stem 26 thereof. O-rings 30 are positioned on either side of the aperture 20 to seal the apparatus.

Referring to FIG. 3, slide body 18b is illustrated. Bore 12 is deeper in this embodiment due to the need for misalignment of windows 22 and 24 with aperture 21 via longitudinal movement of valve body 18b. O-rings 30 are provided to seal the structure. Alignment of windows 22 and 24 with aperture 21 is accomplished to a varying degree by movement of body 18b through stem 26.

Referring now to FIG. 4, another longitudinally actuated valve body is described. Cone valve 18c is essentially a frustocone with a cylindrical extension which mates with a similarly shaped bore 12. Metered flow is accomplished by the degree to which the valve body is urged into the conical/cylindrical bore 12. Windows 22 and 24 are replaced in this embodiment with staggered external opening 32 and internal opening 34. A fluid aperture 21 is not necessary in this embodiment. O-rings 30 are provided to seal the structure. The scope of the frustoconical/cylindrical embodiment of body 18c is important because it allows for very precise metering of the fluid flowing therethrough.

The multiple valve body tool of the invention provides significant latitude in construction and selectivity in flow and is, therefore, valuable to the industry.

Figure 7:
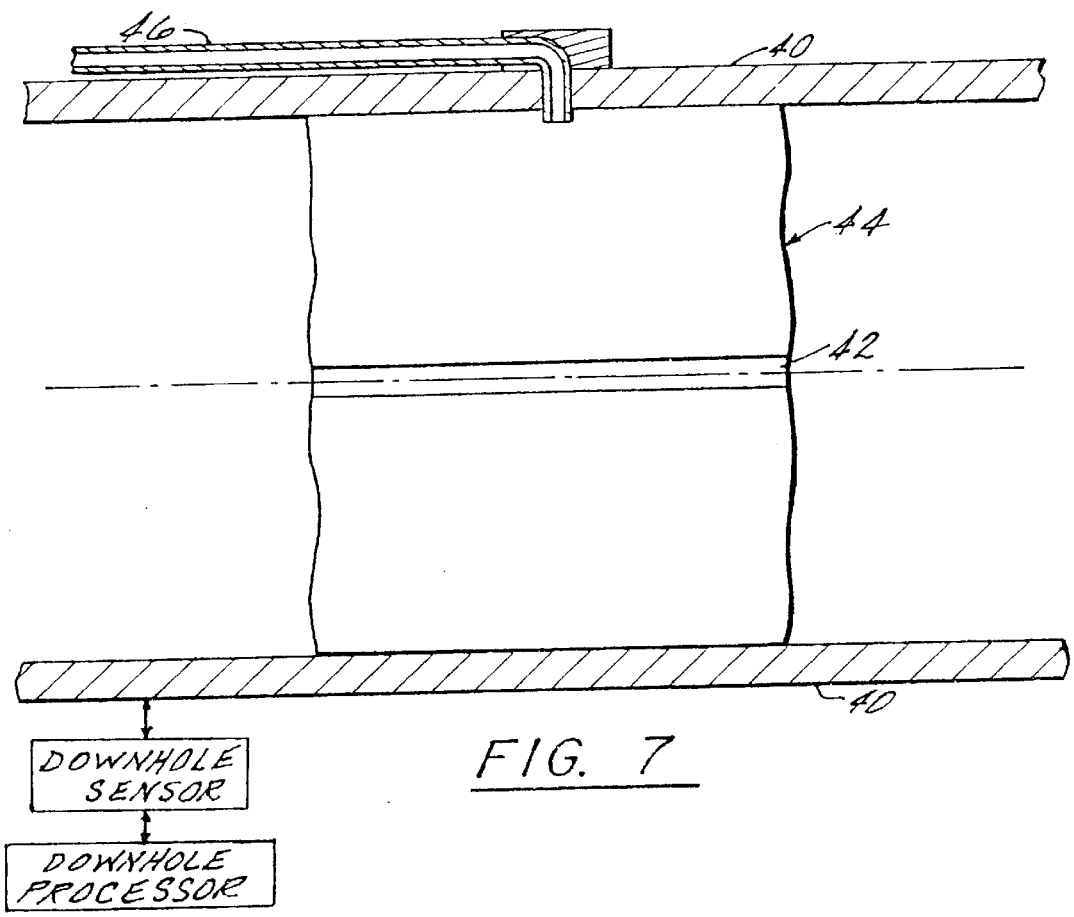
FIG. 7 is a side view of a pressure controlled valve in accordance with the present invention.
Figure 8:
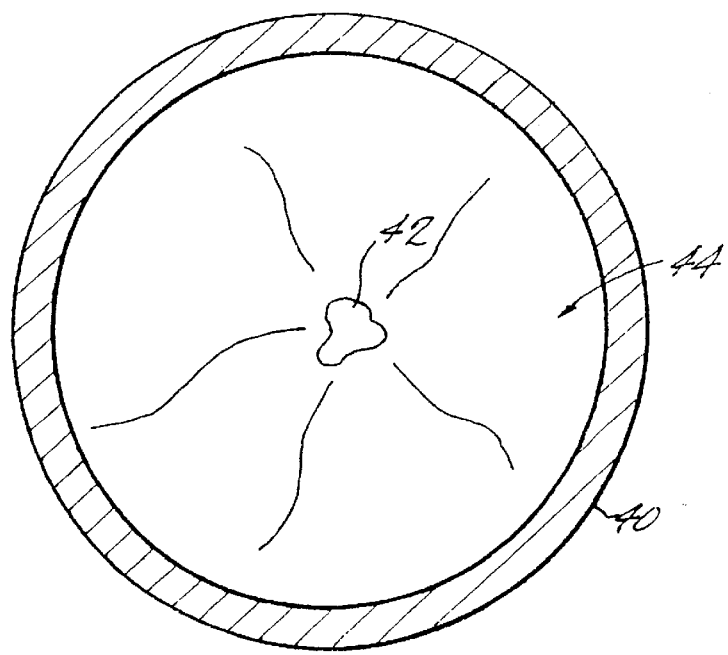
FIG. 8 is an end view of the pressure controlled valve shown in FIG. 1.
Figure 9:
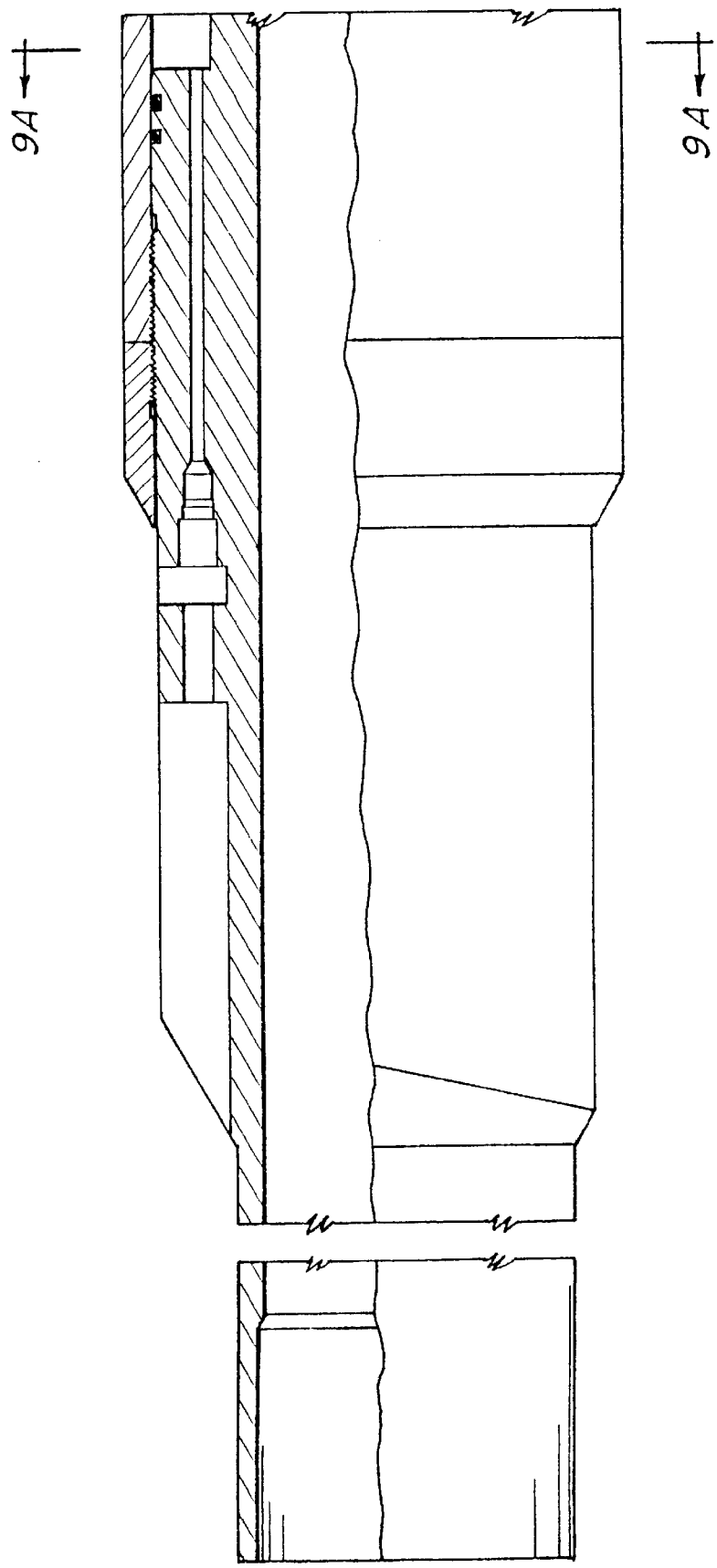
FIGS. 9–16 are an illustration of a third embodiment of the invention wherein an inner and outer choke sleeves are attached to one another.
Figure 10:
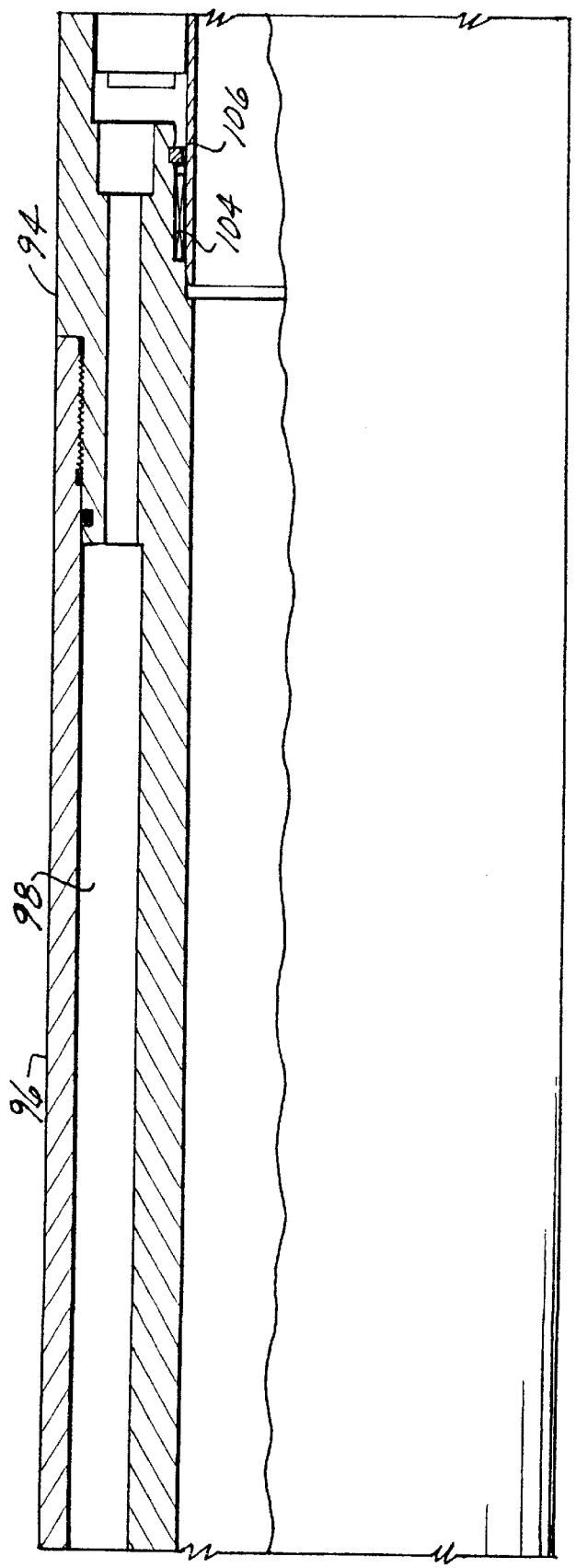
Figure 11:
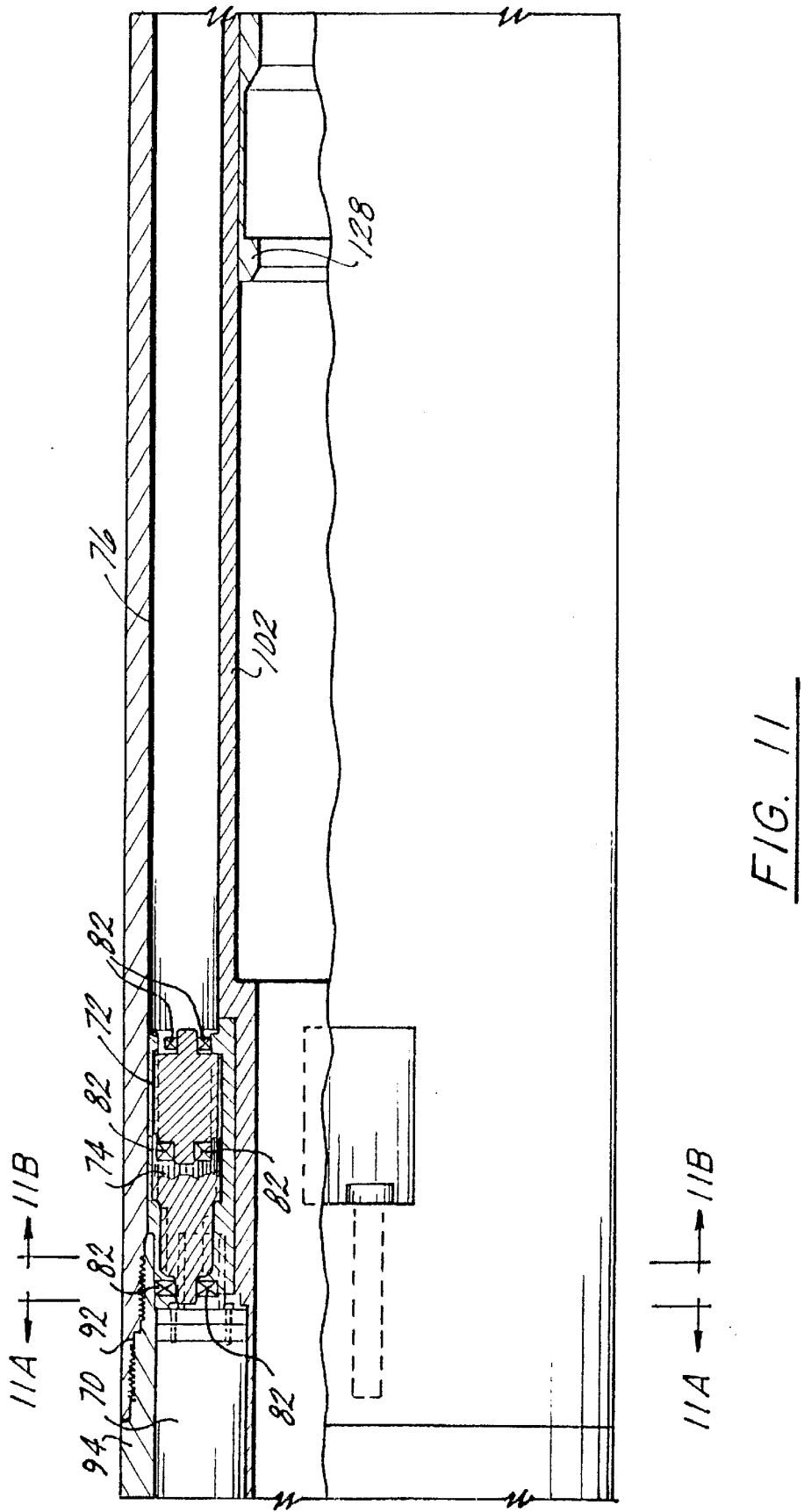
Figure 12:
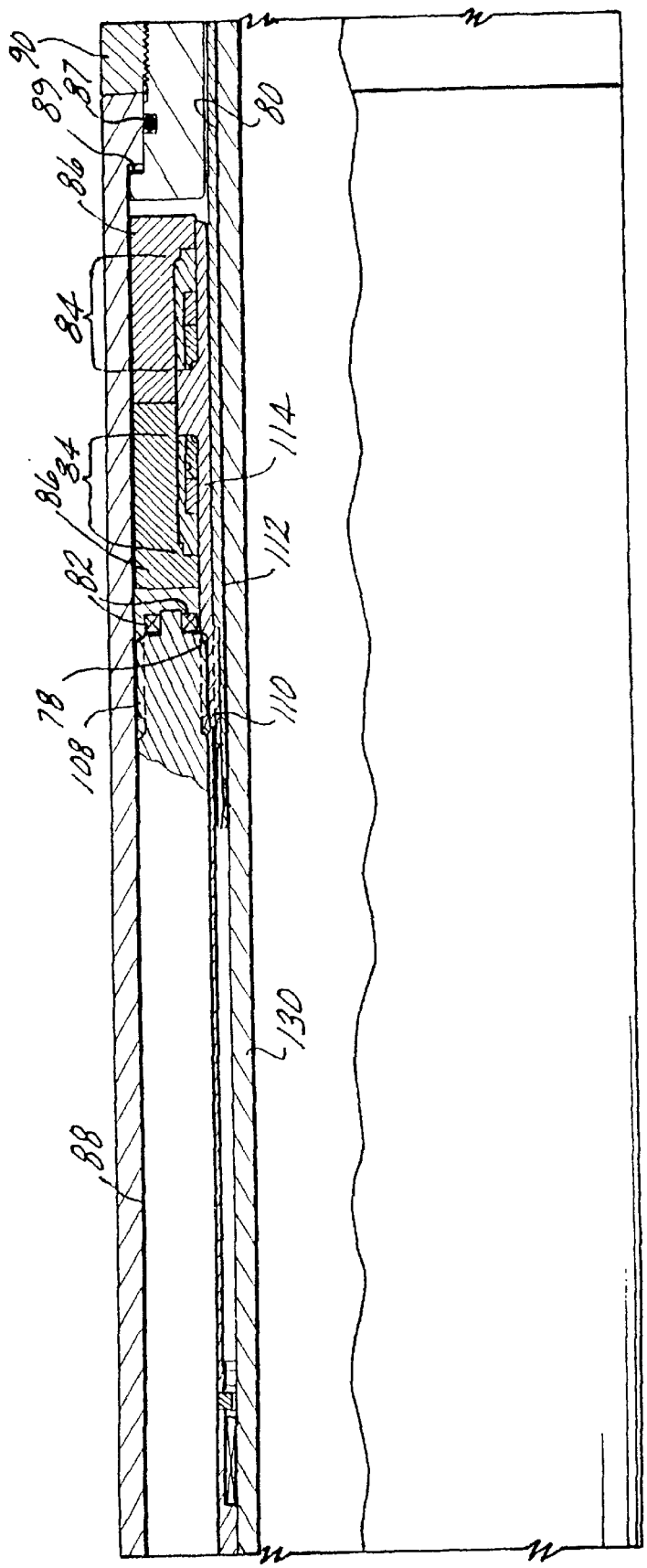

In a second embodiment of the invention, referring to FIGS. 7 and 8, a fluid pressure actuated bladder valve is disclosed. The bladder of the invention is positionable in a section of pipe such that an outer diameter thereof is firmly attached to the inner diameter of the pipe and the inner orifice of the bladder is open or closed depending upon the amount of pressure inside the bladder relative to ambient pressure in the vicinity of the bladder. FIG. 7 is a side view of a pressure controlled valve of the present invention. A toroidal shaped bladder 44 is positioned in the inside of a pipe 40. The bladder 44 may be bonded to the inside of the pipe 40 using an adhesive or any other suitable attachment arrangement which includes but is not limited to a mechanical attachment magnetic element inside the bladder which then pinches the wall of the bladder between the magnetic element and the pipe in which the bladder is positioned. Alternatively, the bladder 44 may be simply positioned in the pipe 40 and maintained in the desired position by friction caused by pressure internal to the bladder. The bladder 44 has an orifice 42 which allows fluid flow through pipe 40 when the bladder is not inflated. The bladder 44 is preferably made of an elastic material which can be inflated and deflated repeatedly without structural degradation. Pressurization and depressurization of the bladder of the invention is effected through a control line 46 which preferably passes through pipe 40 and extends into the interior of bladder 44. Control line 46 is in sealed communication with bladder. The control line 46 controls the pressure within the bladder and can inflate or deflate the bladder 44 through hydraulic, pneumatic or other pressure sources.

When inflated, bladder 44 will expand. Since expansion radially outwardly is inhibited by the pipe in which the bladder is located, the expansion is limited to radially inward and longitudinal. Since the radial inward expansion requires less energy, the bladder tends to close off orifice 42, thus sealing the pipe 40. Desired flow through the pipe 40 can be achieved through applying a determined amount of fluid pressure to the bladder 44.

FIG. 8 is an end view of the pipe 40 shown in FIG. 7 including the pressure controlled valve positioned inside of the pipe 40. As noted above, the centrally located orifice 42 may be opened or closed by deflating or inflating the bladder 44 to control flow through the pipe 40.

The pressure controlled valve of the present invention includes a single moving part, namely bladder 44, which is made from an elastic material. Therefore, the pressure controlled valve can withstand numerous cycles of opening and closing without failure. This feature makes the pressure controlled valve ideal for applications such as downhole flow control and other applications, where ambient conditions are adverse and valve maintenance or replacement is difficult.

The pressure controlled valve may be controlled from the surface of the well or through downhole intelligence located within the well. A representative downhole intelligent control is schematically illustrated in FIG. 7 but it will be appreciated that the invention is also capable without the intelligent systems illustrated. Downhole intelligence, intelligent sensor arrangements, (e.g., position sensors, pressure sensors, temperature sensors, etc.) and communications for communicating to a downhole or surface microprocessor via any conventional communication device or media such as telemetry devices, wireline, TEC wire, cable, etc., are beneficial to the operation of the above-described valve. Moreover, the downhole intelligence systems described in U.S. Ser. No. 08/385,992 filed Feb. 9, 1995 by Baker Oil Tools and previously incorporated herein by reference are desirable to monitor conditions including the status of the pressured controlled valve and initiate and execute commands. By monitoring conditions downhole, metered adjustments of the pressure controlled valve can be made to boost efficiency and production of any given well. This type of downhole intelligence is employable and desirable in connection with all of the embodiments disclosed herein and while only some of the embodiments contain direct reference to intelligent systems and controls it will be understood that these can be for all of the embodiments.

In a third embodiment of the invention, referring to FIGS. 9–16 a dependent sleeve choke mechanism includes a ported housing 60 which is flanked on its inner diameter by inner sleeve 62 and on its outer diameter by choke sleeve 64. Sleeves 62 and 64 are attached to one another by retaining key 66 such that a single actuator may be employed to move both inner sleeve and choke sleeve to full open positions or choked positions or anywhere in between. As one of skill in the art will understand, the precise actuator employed may be electric, pneumatic, hydraulic, combustion motor or otherwise. The most preferred embodiment, however, is illustrated in FIGS. 9–16 and employs an electric motor 70 which translates force through a gear train located in and supported by a gear body 102 and spur gear body 77 comprising spur gear 72 in contact with the motor 70, which drives drive shaft 76 transmitting force efficiently which, in turn, meshes via spur gear 108, 110 profiles with drive screw 78. Drive screw 78 provides a screw thread on the I.D. thereof which is complimentary to an O.D. thread on the uphole end of drive sleeve 80. Drive sleeve 80 provides linear force to inner sleeve 62 via dog 116. In order to assist the gear train in transmitting force efficiently, there are provided several bearings 82 throughout the gear train. Further, and to increase the ability of drive screw 78 to impart driving force upon drive sleeve 80, thrust bearings 84 are provided. Thrust bearings 84 are retained by thrust bearing retainers 86 which are housed along with drive shaft 76 within gear housing 88. The gear train is maintained within gear housing 88 which is connected to more downhole components of the tool via a splined connection 89 and a retaining nut 90. A seal 87 prevents undesired fluid passage at the uphole end, gear housing 88 is connected to motor housing 94 by double metal to metal seal thread 92. These connections provide an environment for operation of the gear train. The environment is most preferably filled with pressure compensated dielectric fluid. Beyond the motor housing 94 in the uphole direction, motor housing 94 is connected to electronics housing 96. Electronics housing 96 defines an atmospheric chamber 98 which houses the downhole electronics processors and power sources or power couplers associated with the choke of the invention. It should be noted that all of the chokes of the invention employ similar electronics packages and similar housings. These elements are, therefore, not discussed in detail with respect to each embodiment. It will be noted that in order to prevent wellbore fluids from entering the motor area, a seal 104 is maintained in place by a snap ring 106.

Referring back to the gear train, more detail is provided. At the downhole end of drive shaft 76, the shaft is endowed with a spur gear arrangement 108 which engages an O.D. spur gear 110 on drive screw 78. On the I.D. of drive screw 78, which is not readily visible from the drawing, however will be understood by one or ordinary skill in the art, is a threaded arrangement 112 which meshes with an O.D. thread 114 on drive sleeve 80. Drive sleeve 80 is connected to inner sleeve 62 by dogs 116 so that linear movement of drive sleeve 80 is directly translated to inner sleeve 62 and consequently translated through key 66 to choke sleeve 64. It should be noted that choke sleeve 64 includes at its uphole end, a cover 118 whose purpose it is to avoid the entry of wellbore debris into the area in which key 66 slides. Were the debris to enter the area, the key may not slide as intended and the tool would need to be repaired. As can be ascertained from the drawing FIG. 15, the port 120 in ported housing 60 can be exposed or closed off by the movement above described.

Seals 74 provide closure of port 122 from port 120 of the port housing 60 providing complete separation of annulus fluid from tubing fluid when the inner sleeve 62 is placed in the downward position. Seals 74 are on the same axial diameter to reduce the net force caused by differential piston areas to zero differential.

It should be noted that port 122 of the inner sleeve aligns with port 120 of the ported housing 60, thus rendering that part of the device fully open, prior to the choke sleeve 64 pulling uphole sufficiently to clear port 120 from port housing 60. This is due to extra length on the downhole end of sleeve 64. This is an important feature of the invention since when choke sleeve 64 is placed in the choke position the inner sleeve 62 is more fully open. By providing alignment of port 120 and port 122 flow cutting of the inner sleeve is prevented. Secondly, with the choke sleeve 64 extended in the manner described, erosional wear caused by flowing in the choked position does not immediately effect the function of the device such that the inner sleeve would be damaged by the choke sleeve not functioning as intended. In other words, the extended portion of the choke sleeve 64 provides for extended life of the tool by the effective extra length thereof. Moreover, in order to avoid erosional wear of the choke sleeve, a hard wear resistant material such as tungsten carbide is either applied as a coating to sleeve 64 or actually makes up all or a part of sleeve 64.

At the downhole end of choke sleeve 64 in the closed position, it is abutted against lower sub upset 124 which provides both a downhole stop for the choke sleeve 64 and, furthermore, is slightly wider in outside diameter to protect the choke sleeve 64 from damage during run in.

It should be noted that the motor housing is offset from the sleeve to accommodate the motor, gear train, electronics and compensation system while minimizing the O.D. of the tool.

In the most preferred dependent sleeve embodiment, a position sensor such as a linear potentiometer, linear voltage displacement transducer (LVDT), resolver or synchro is employed. The exact location of the position sensor is not illustrated but can be anywhere along which linear movement is experienced or where rotary movement is experienced in the event that a rotary position sensor is employed.

In this as well as the other embodiments of this invention, the motor and gear train are protected by a pressure compensated dielectric fluid. Referring to FIGS. 11C and 11D, two alternative pressure compensators are illustrated. Both compensator designs are intended to separate well fluid from the dielectric fluid with a moveable member to allow pressure to change within the dielectric fluid in response to a change in pressure of the surrounding fluid. In FIG. 11C, the compensator is a piston 101 mounted moveably in a cylinder 103 cut in motor housing 94. The location of the compensator cylinder is not critical and is shown, for example, in FIG. 11A. Cylinder 103 is open to tubing pressure through port 105 and is open to the dielectric fluid at the opposite end of the cylinder. The piston includes conventional parts such as a piston body and cap and nonelastomeric seals.

In the alternative embodiment, a bellows 107 is employed to do the same job as piston 101. The bellows embodiment provides the advantage of eliminating piston seals and increasing responsiveness to pressure changes however suffers the disadvantage increasing tool length due to short throw. The metal bellows is commercially available from Senior Aexonics.

Figure 13:
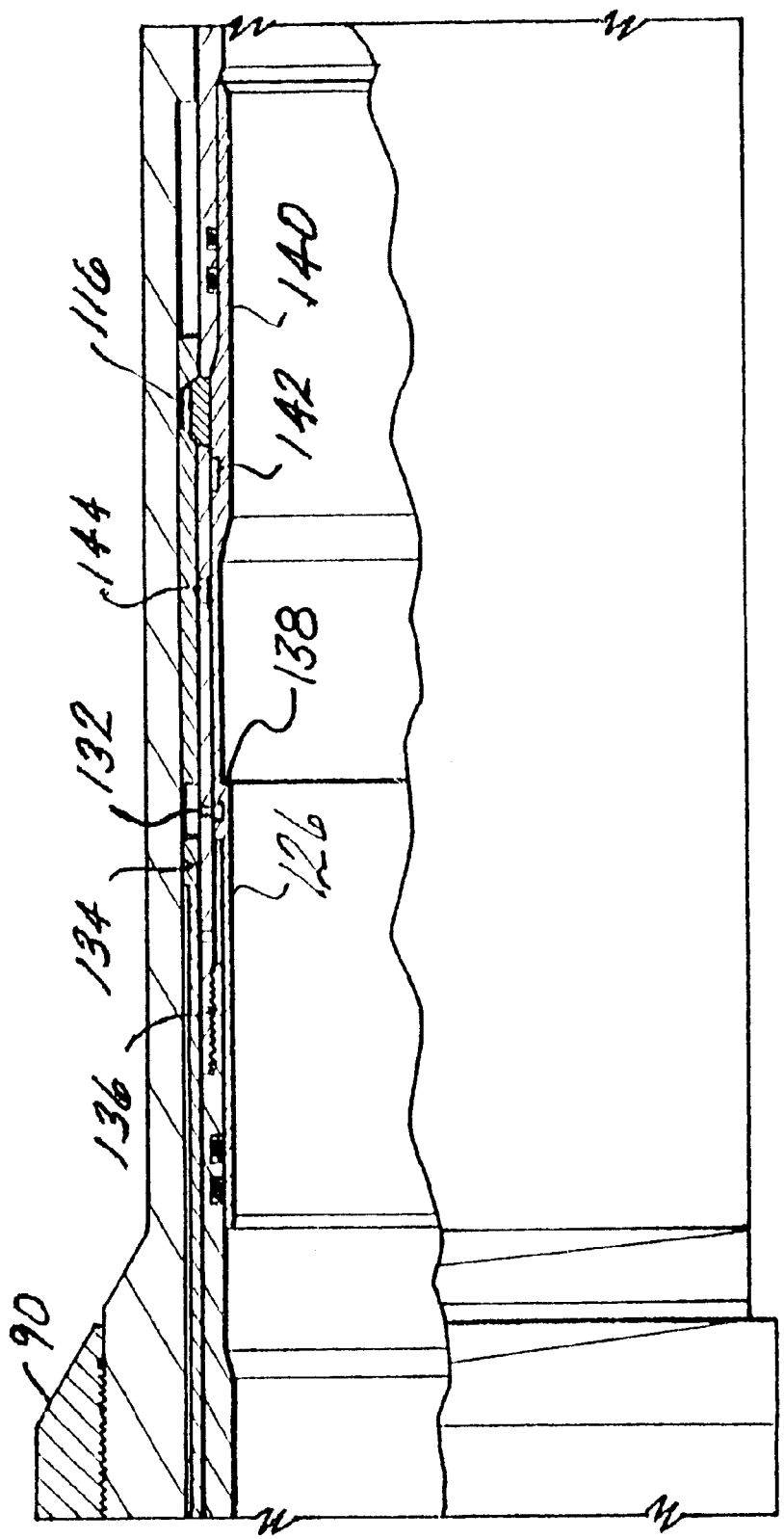
Figure 14:
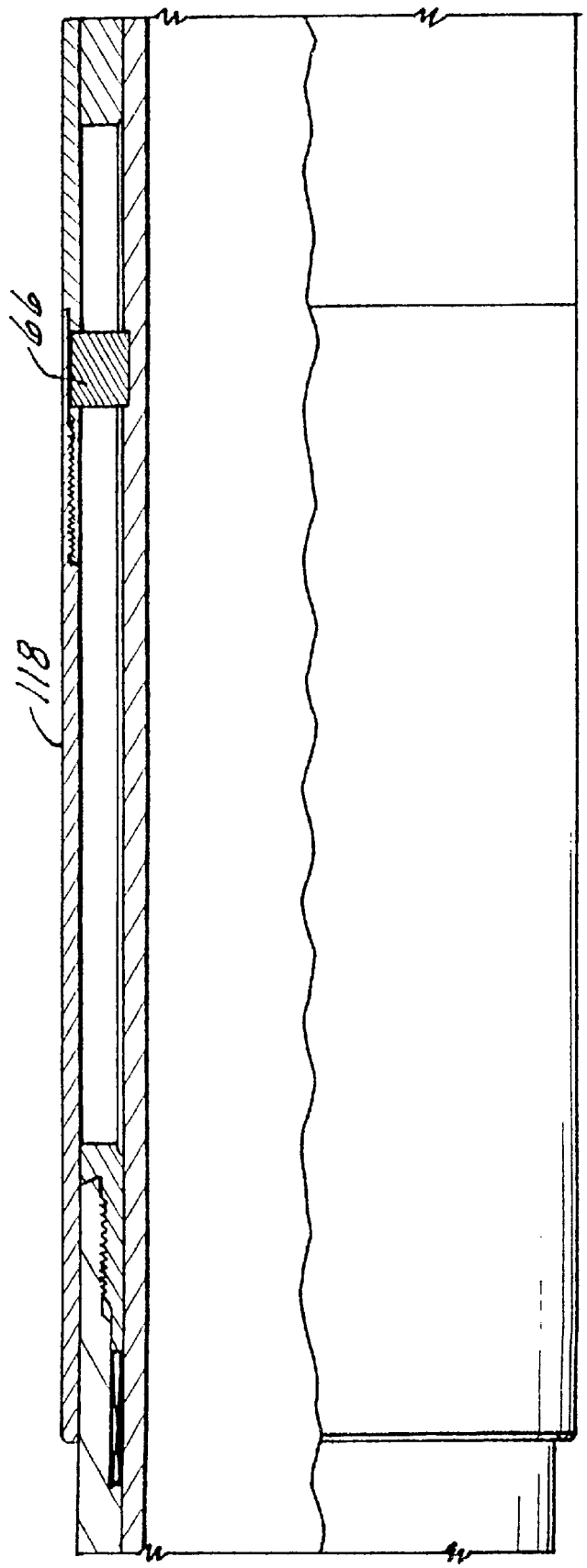
Figure 15:
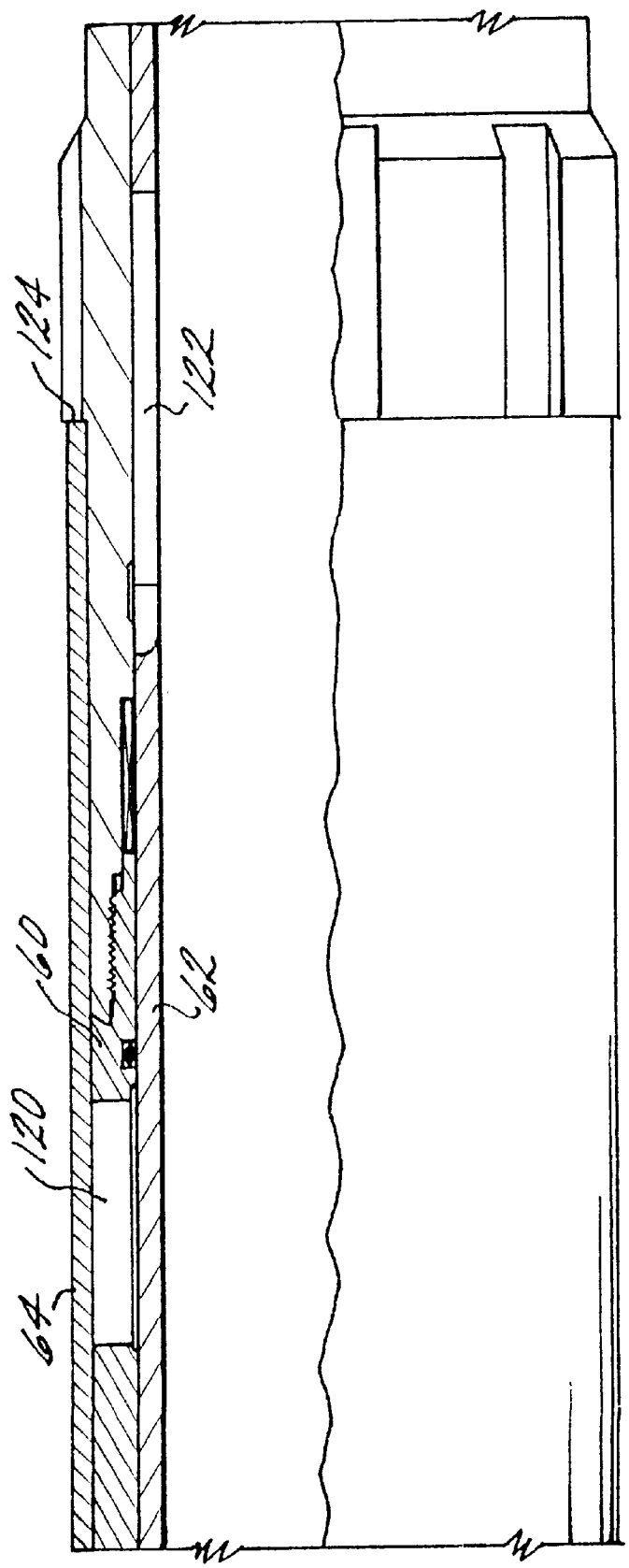
Figure 16:
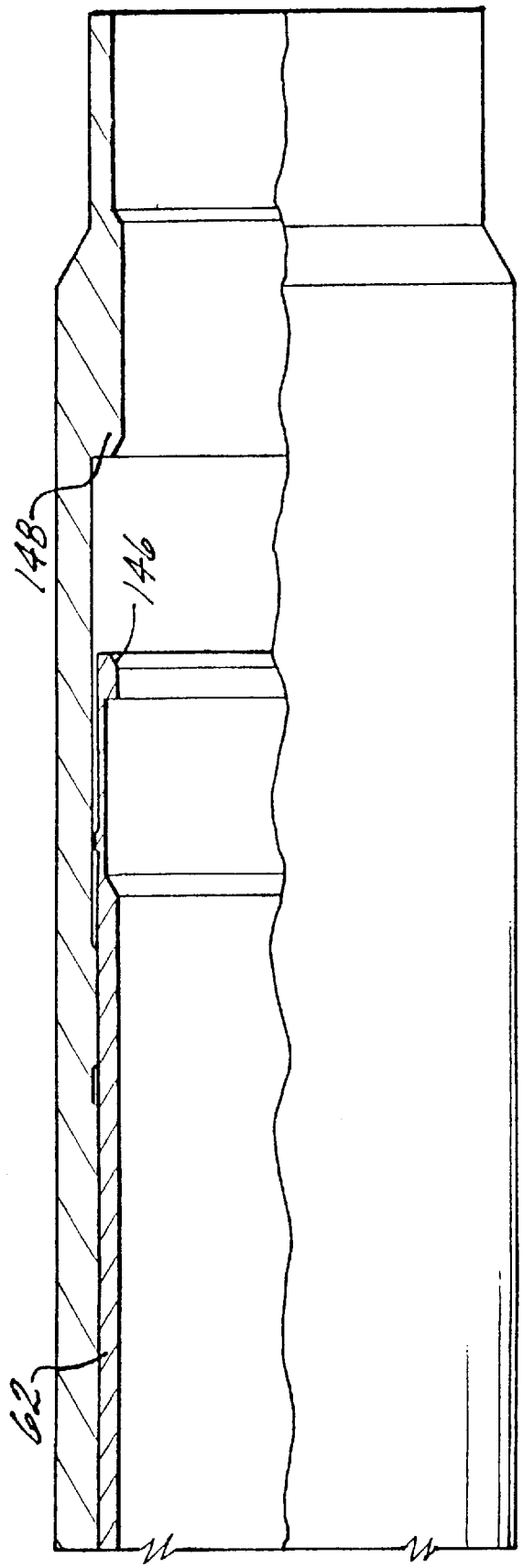
Figure 17A:
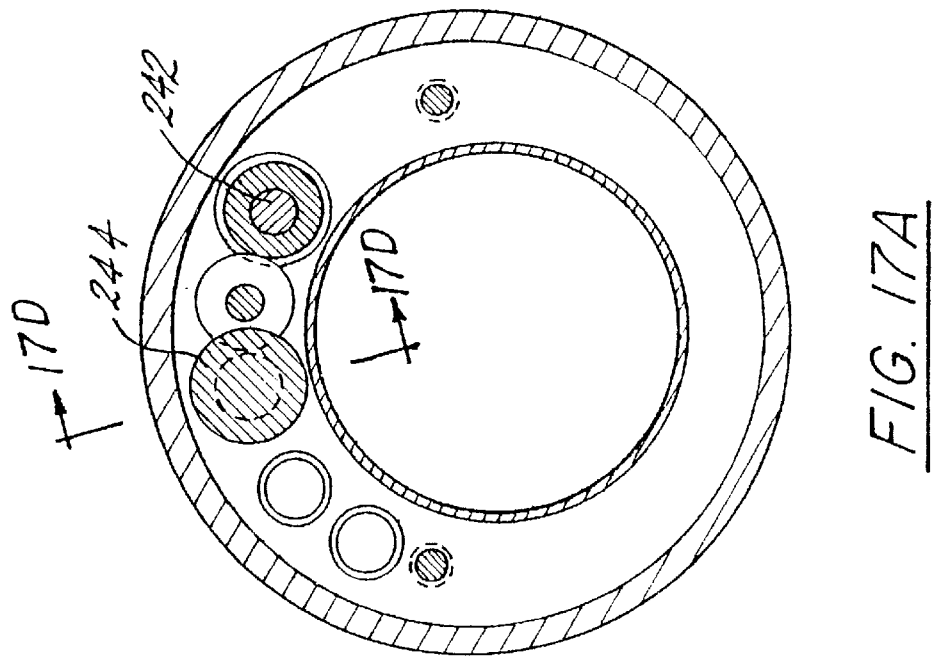
FIG. 17A is a cross-section view taken along section lines 17A—17A in FIG. 17.
Figure 17D:
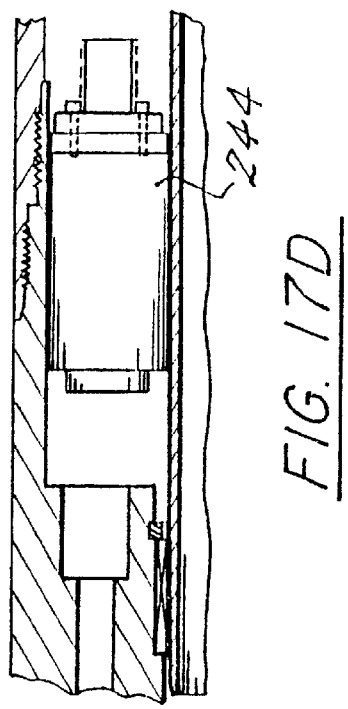
FIG. 17D is a cross-section view taken along section lines 17D—17D in FIG. 17A.
Figure 18:
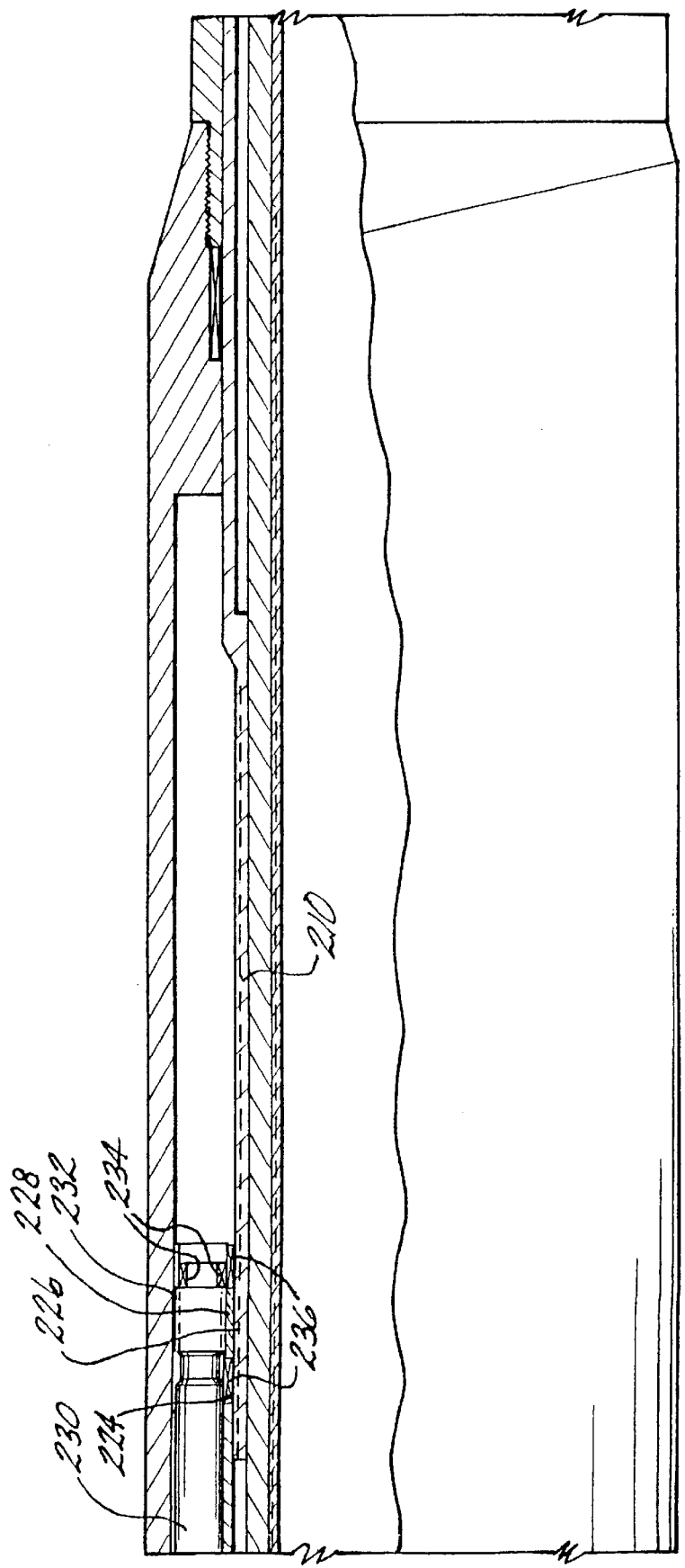
Figure 19:
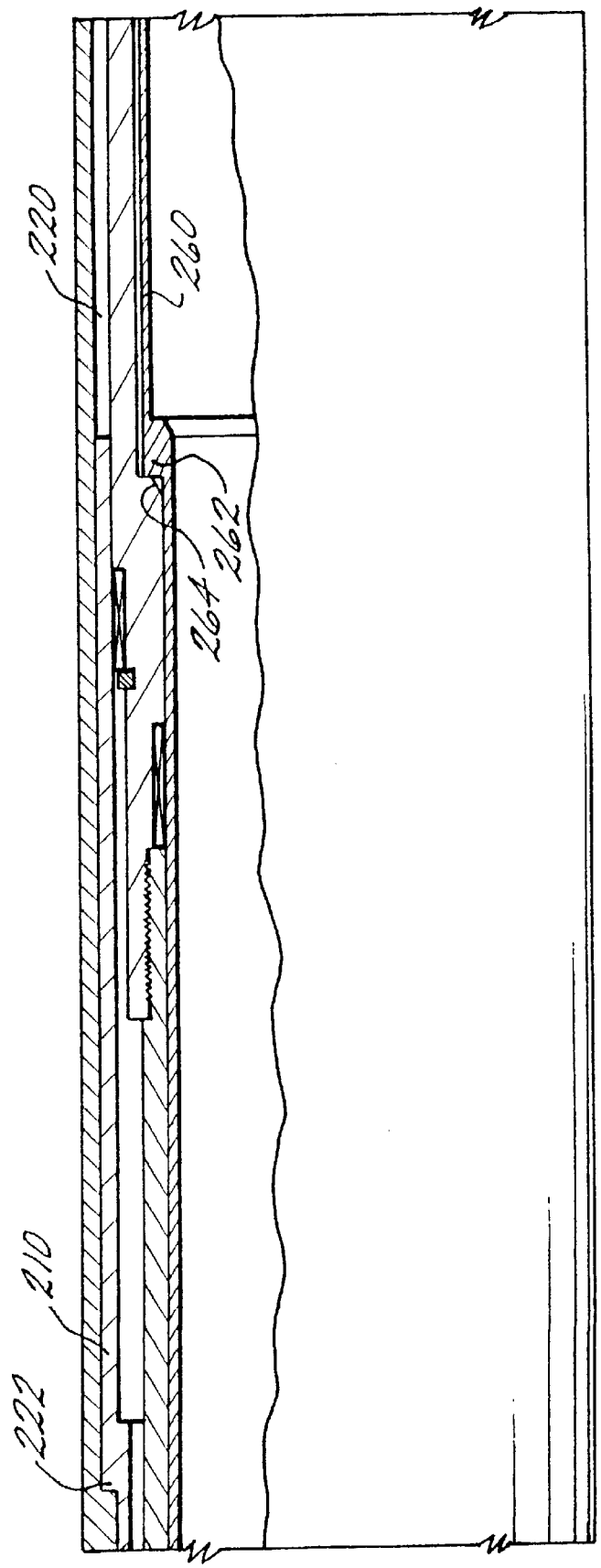

The choke system of the invention provides for backup conventional shifting tool actuation in the event of the actuator of the invention failing. Referring to FIG. 13, and back to dogs 116, the drive sleeve 80 may be disconnected from inner sleeve 62 by shifting shear out sleeve 126 uphole through use of a conventional shifting tool acting upon shear out shoulder 138 (see FIG. 13). Upon engaging a shear out shoulder 138, shear out sleeve 126 is provided with sufficient shear stress to entice shear screw 132 to fail thus allowing shear sleeve 126 to slide uphole until the shoulder 134 impacts the downhole end of 136 of shifting sleeve 130. Upon the moving uphole of shear sleeve 126, dog 116 will move radially inwardly onto the downhole end 140 of shear sleeve 126 so that dog 116 is no longer in communication with drive sleeve 80. The shear out sleeve 126 when reaching its uphole extent, as discussed above, allows snap ring 142 to snap radially outwardly into ring groove 144 to prevent any additional relative movement between sleeve 126 and sleeve 62. By preventing such relative movement, the dog is prevented from reengaging with drive sleeve 80 due to other well operations.

At this point, a shifting tool of a conventional nature will be employable upon shifting profile 128 to actuate inner sleeve 62 and (through key 66), choke sleeve 64 in the uphole direction. Moving the sleeves in the uphole direction, as noted previously, will open the device. By employing the shifting profile 146 at the downhole extent of inner sleeve 62, sleeve 62 and sleeve 64 may be shifted to the closed position. When operating the tool in the closing process on shifting profile 146, the well operator can be assured that a tool will not be driven beyond its proper orientation by stop shoulder 148 which is part of the ported housing 60.

Referring to FIGS. 17–22, an independent sleeve choke mechanism is disclosed wherein two independent movable sleeves are located on either side of the ported housing. The ported housing is similar to that disclosed with respect to the dependent sleeve choke mechanism described hereinabove and allows fluid to flow through the port depending upon positions of a choke sleeve and an inner sleeve. As in the foregoing embodiment, a choke sleeve includes a hard material either applied to the exterior of the sleeve or comprises part of all of the sleeve itself.

Figure 20:
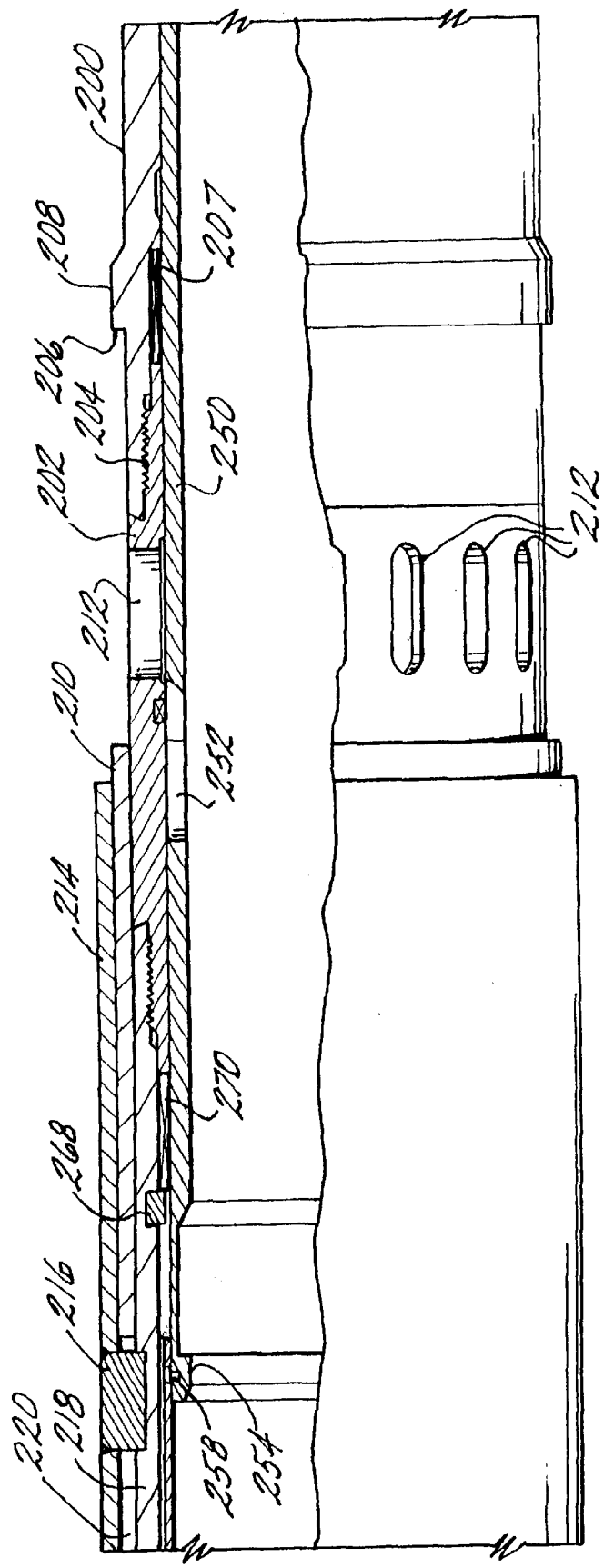
Figure 21:
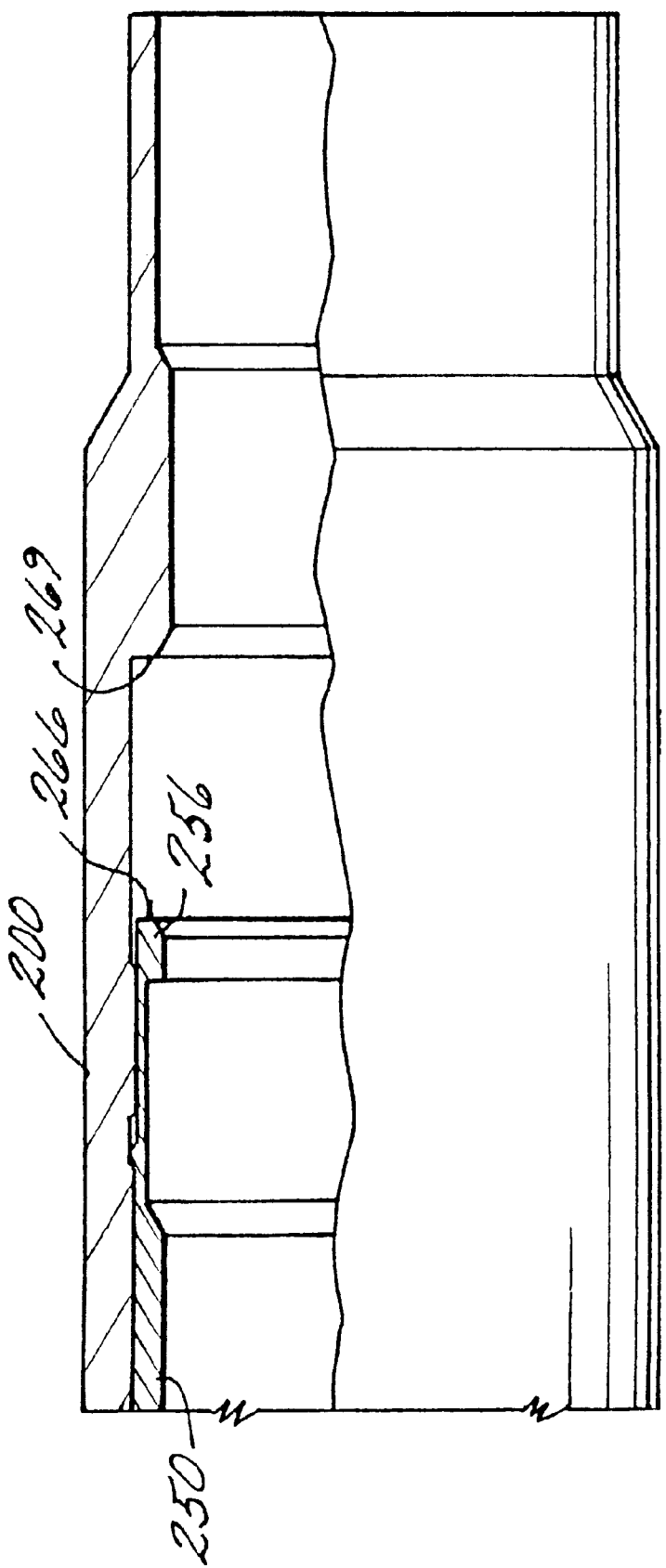
Figure 23:
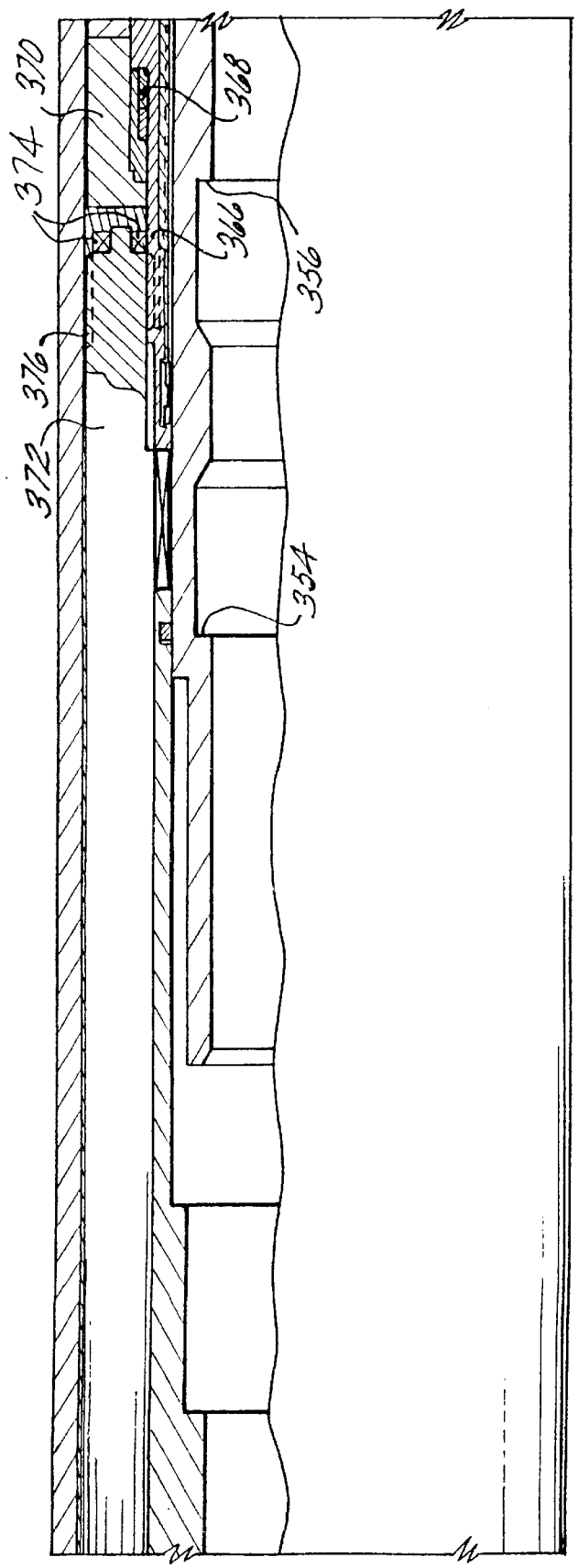
FIGS. 23–27 represent a fifth embodiment of the invention wherein a nose seal choke mechanism is illustrated.
Figure 24:
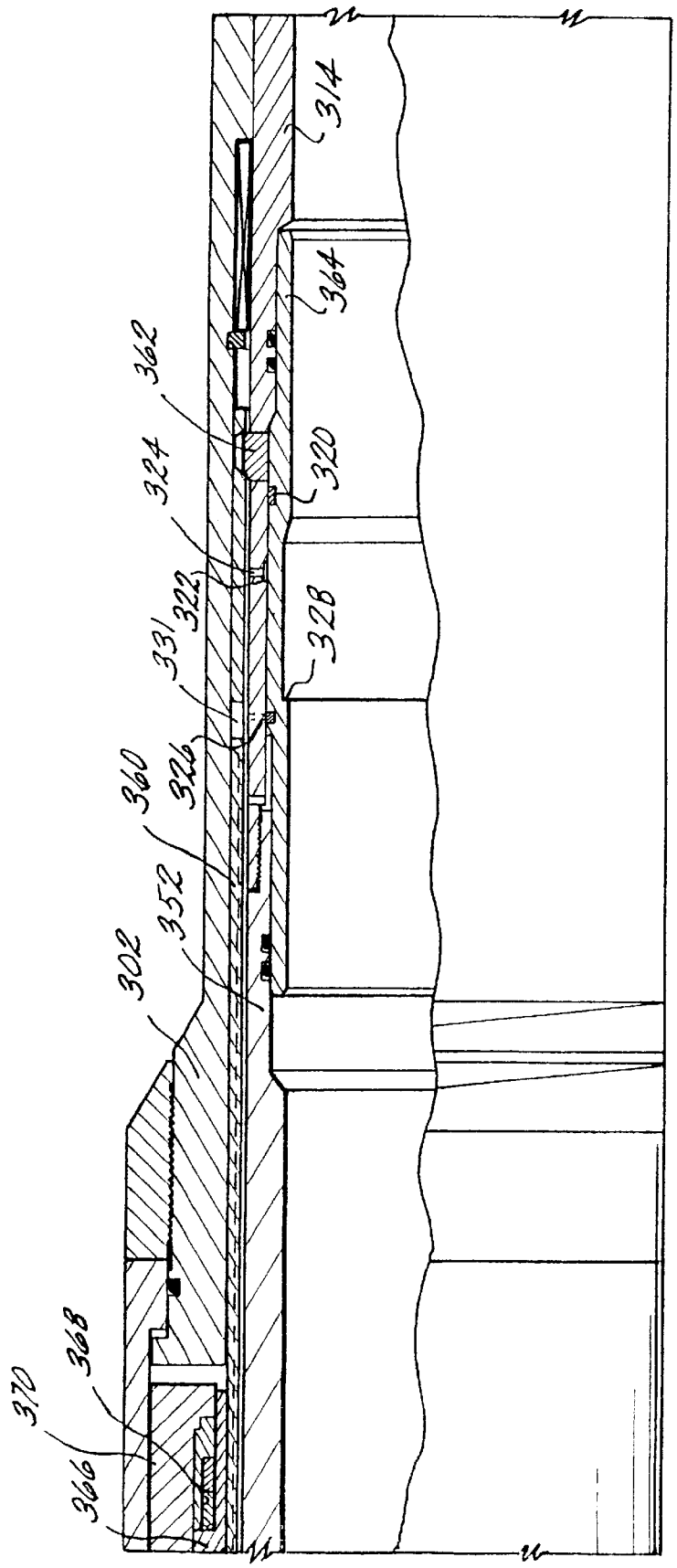

Beginning from the downhole end of the tool and referring directly to FIGS. 20 and 21, lower sub 200 extends upwardly to join with ported housing 202 at threaded connection 204 and includes seal 207. Lower sub 200 further includes a radially enlarged section 208 having a shoulder 206 which acts as a downstop for choke sleeve 210. Choke sleeve 210 is actuatable in a linear manner to conceal and reveal port 212, in ported housing 202. As one of skill in the art will undoubtedly understand, port 212 is most preferably a plurality of ports arranged circumferentially about the invention. It is within the scope of the invention to have as few as one port. Choke sleeve 210 is protected by choke cover 214 which is non-moveable and is anchored to keys 216 which extend from choke cover 214 to choke connector sleeve 218. Choke sleeve 210 includes a groove 220 which allows it to slide longitudinally past keys 216. In other words, keys 216 ride within groove 220 and prevents rotational movement of sleeve 210. Rotational movement must be prevented in sleeve 210 since the actuation mechanism which provides the longitudinal movement of choke sleeve 210 is provided by a drive screw which without being prevented from allowing rotational movement, would merely rotate the choke sleeve as opposed to driving it longitudinally. Keys 216 also carry tension from above the tool to below by transferring the load from choke cover 214 through keys 216 to choke connector sleeve 218. More particularly, and referring to FIGS. 18 and 19, choke sleeve 210 continues uphole past shoulder 222 to an uphole end thereof having O.D. threads 224 complimentary to I.D. threads 226 on choke drive screw 228. Choke drive screw 228 is driven by choke drive shaft 230 having spur gear teeth 232 at the downhole end thereof. It will be noted by one of ordinary skill in the art that bearings 234 are positioned at the downhole end of the choke drive shaft 230 to provide for support of the drive shaft 230 and avoid drag.

An important feature of the invention includes thrust bearings 236 located on either side of choke drive screw 228. Thrust bearings 236 provide for more smooth power transfer from drive shaft 230 to choke sleeve 210. Better power transition allows for the use of a smaller and less costly motor. Drive shaft 230 extends uphole to its terminus at spur gear 240. Drive shaft 230 is supported at its uphole end, similar to its downhole end, by bearings 234. Drive shaft 230 is driven by a motor illustrated in FIGS. 17A and 17D as numeral 244 through the action of solenoid 242 which selectively engages one of the idler gears 278 in order to drive either choke drive shaft 230 or the inner sleeve drive components 272. Referring back to FIGS. 20 and 21 and a downhole end of the tool of the invention, inner sleeve 250 extends longitudinally and exists radially inwardly of port 212. Inner sleeve 250 further includes port 252 which is alienable or misalignable with port 212 as desired. Inner sleeve 250 includes shifting profiles 254 and 256 for conventional shifting of the sleeve in the event of a drive system failure. Should such failure occur, the shear screw 258 need merely be sheared by a tensile force exerted on, for example, profile 254. Once shear screw 258 has sheared, the drive system is disconnected from sleeve 250 and it can be normally shifted with a conventional shifting tool.

Providing the drive system has not failed, shear screw 258 remains intact and securely binds sleeve 250 to drive sleeve 260 which moves longitudinally up and downhole, pursuant to the movements of an actuator system more thoroughly discussed below. Longitudinal movement of inner sleeve drive sleeve 260 is limited by shoulder 262, at the uphole end thereof, impacting against stop 264 located on choke connector sleeve 218 and is bounded at the downhole end thereof by sleeve end surface 266 which abuts shoulder 269 when the sleeve 250 is at its downhole most position. Snap ring 268 maintains seal 270 in the desired position. Inner sleeve drive sleeve 260 extends uphole to a threaded engagement 274 with inner sleeve drive screw 272. It should be noted that preferably inner sleeve drive screw 272 is a spur gear arrangement on its O.D. surface and a threaded arrangement on its inner surface. The threads mate to O.D. threads on the inner sleeve drive sleeve 260. Thrust bearings 276 are provided on either side of inner sleeve drive screw 272 to more efficiently transfer power to drive sleeve 260. This is obtained by reduced friction due to the thrust bearings. Several idler gears are provided in the drive system one of which is visible in FIG. 17 and is indicated as numeral 278.

Referring to FIG. 22, a schematic perspective view of the drive system of the invention will provide a better understanding to those of skill in the art regarding how the system is driven. Idler gears are indicated collectively as 278. The solenoid is identified by numeral 242 with solenoid gear 279, and the drive motor is 244. The inner sleeve drive screw 272 is closer to the motor arrangement and choke drive screw 228 is further away. Choke drive shaft 230 is also illustrated. The inner sleeve drive gear is illustrated as 280. FIG. 22 in conjunction with the foregoing and FIGS. 17–21 provide the skilled artisan with an excellent understanding of the invention.

The solenoid of the invention operates in a manner very similar to that of an automobile solenoid and moves to engage one drive gear 280 or in order to drive the inner sleeve 272 or the choke sleeve 228 in the gear train described and illustrated.

Power is fed to the solenoid and motor through the motor housing 282 by conduit 284 which houses connector 281 such as a Kemlon connector, known to the art, said conduit leading to electronics housing area 286 which is hermetically sealed by electronics housing cover 288 threadedly connected at 290 to motor housing 282 and includes seal 292 to prevent wellbore fluids from contaminating the electronics which may include downhole processors, sensors and power sources. As discussed earlier, power may come from the surface or from downhole sources.

As in the previous embodiment, the motor and solenoid are most preferably surrounded in pressure compensated dielectric fluid. The pressure compensation device are as was discussed previously. The fluid in this embodiment exists in area 294 and is sealed from surrounding fluids by seal 296 held in place by snap ring 298.

Referring to FIGS. 23–27, a seal nose sleeve choke mechanism of the invention is disclosed. The device employs a dual operation concept which allows for increased longevity in the useful life of the tool. Beginning at the downhole end of the tool in FIG. 27, a lower sub 300 is threadedly connected to a ported housing 302. It should be noted that the lower sub contains a stop shoulder 304 which is employed only in the event of an electronics or motor drive failure or other failure in the seal nose of the device. More specifically, Dog retaining sleeve 306 will abut against shoulder 304 in the event the shear release of the invention is employed. In the event of a failure requiring the shear release to be employed, snap ring 308 is provided which will lock into groove 310 of ported housing 302 to maintain dog retaining sleeve 306 in the downhole position should such mechanical operation be required. The dog retaining sleeve 306 is threadedly connected to downstop 312 which communicates with inner sleeve 314. It should be noted that in normal operation, dog retaining sleeve 306 is fixedly connected to ported housing 302 via dog 316 to prevent relative movement between the two sleeves. Providing electronic and/or automatic operation of the choke mechanism of the invention is functioning properly, no relative movement between the dog retaining sleeve 306 and ported housing 302 is necessary or desirable.

It should be noted that the shear out sleeve 318 is exactly the same as the shear out sleeve discussed previously and, therefore, will not be discussed in detail here other than to list numerically the parts thereof. Sleeve 318 includes snap ring 320 and snap ring groove 322 as well as a set slot 324 which enables a technician or machine during assembly of the tool to press snap ring 320 into the sleeve 318. Shear screw 326, (obviously most preferably a plurality of shear screws 326) maintains the shear out sleeve 318 in the engaged position until a shifting tool is brought to bear against shifting profile 328 whereby shear screw 326 is sheared and the shear sleeve 318 is shifted uphole to release dog 316.

Figure 25:
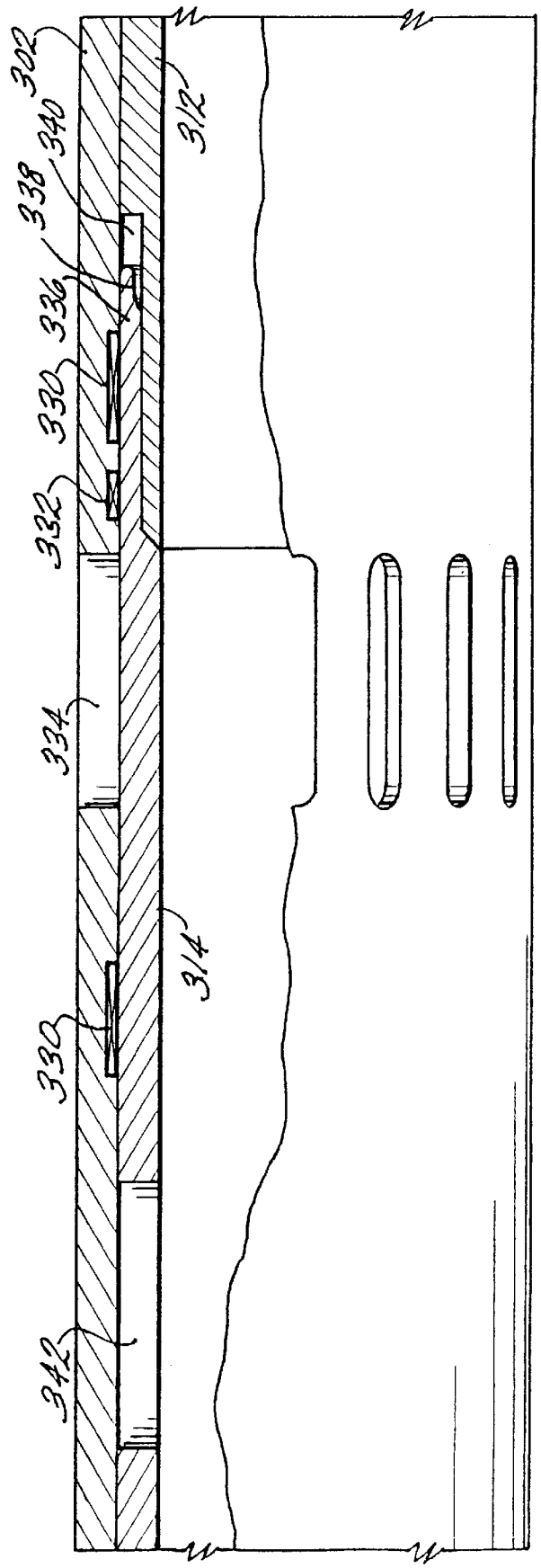
Figure 26:
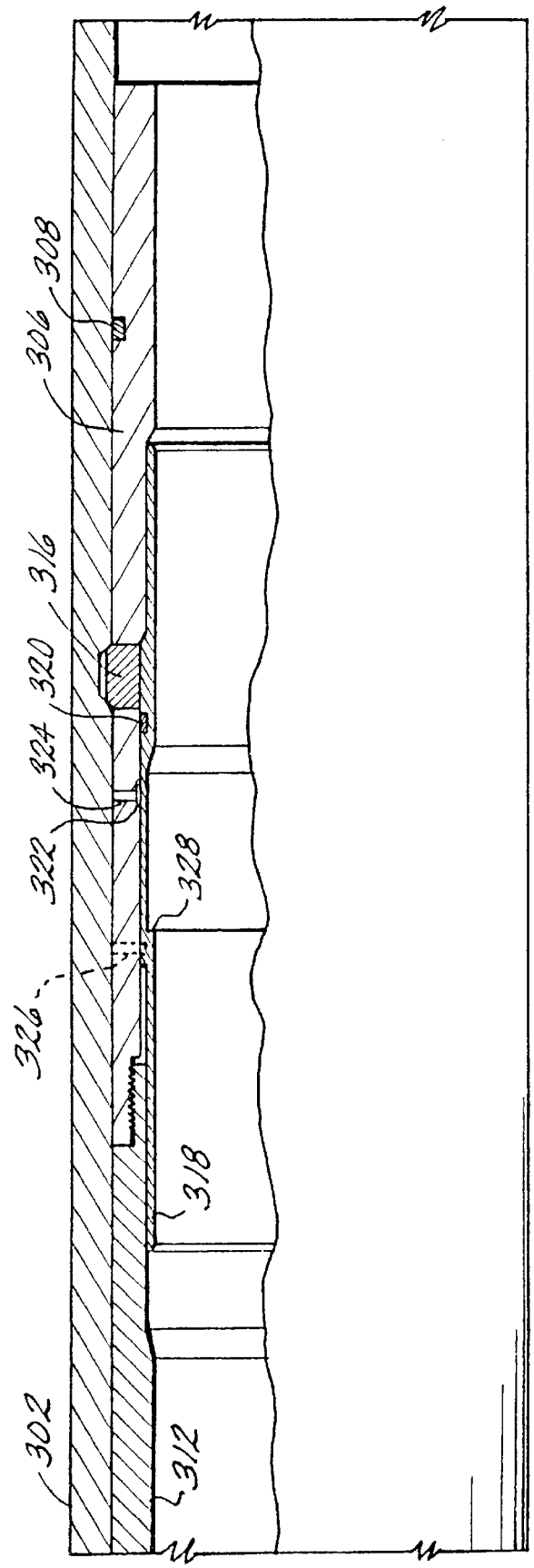
Figure 27:
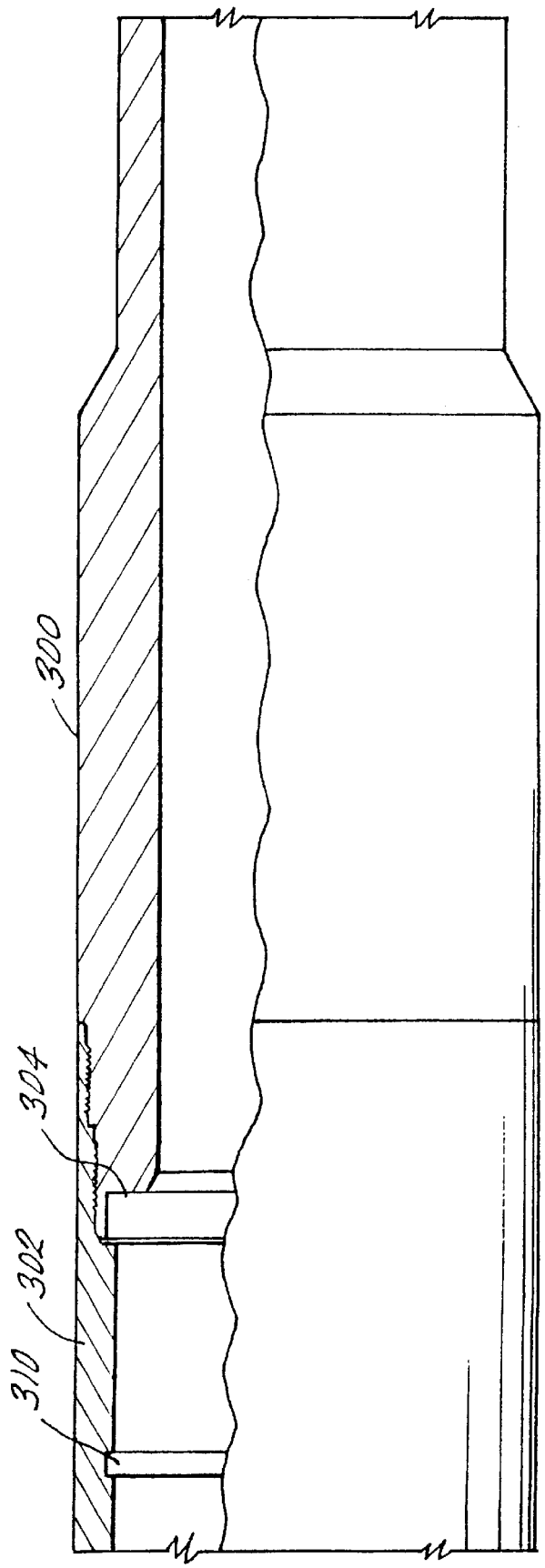
Figure 28:
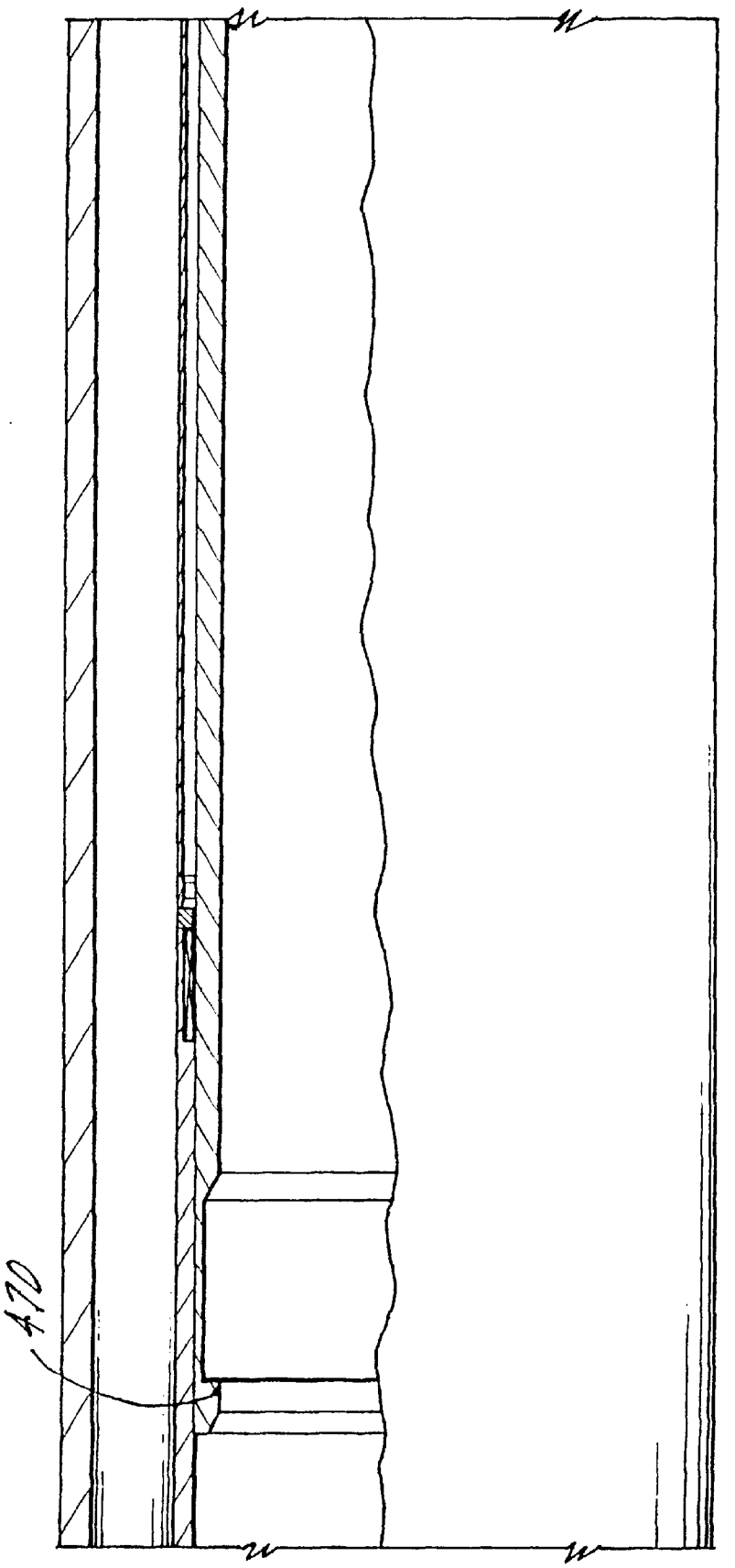
Figure 29:
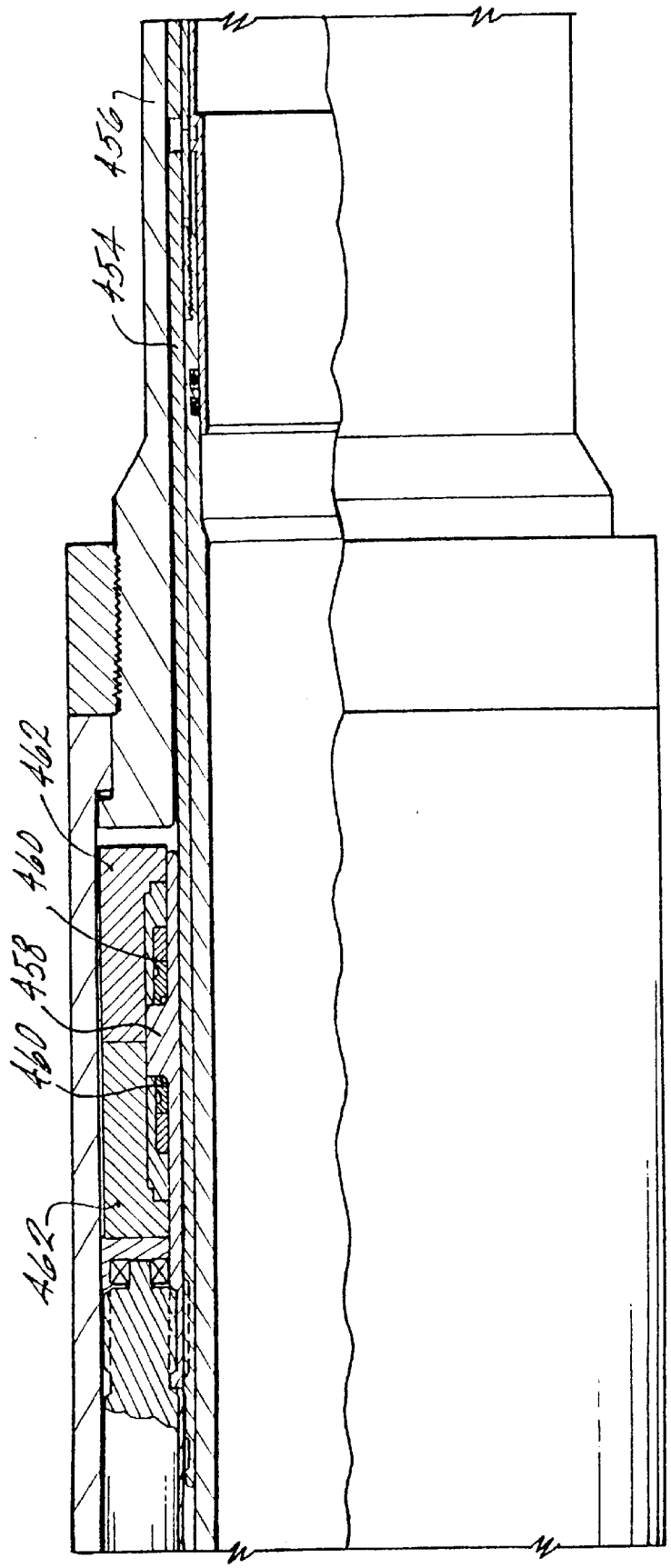

Moving uphole into FIG. 25, and in the normal (not shear released) operation of the tool, ported housing 302 includes seal 330 and defuser ring 332 which operate the seal fluid flow through port 334 and prevent seepage during periods when such flow is not desired.

Inner sleeve 314 includes nose 336 which extends into annular groove 340 of downstop 312. This provides a metal to metal seal to choke off flow through port 334. It should also be noted that in order to reduce the chances of washout of seals 330 or flow cutting thereof, annular recess 338 is provided nose 336. This allows for a reduced flow rate during opening of inner sleeve 314 to reduce wear on seal 330. Inner sleeve 314 further includes port 342 which is employed in the event of loss of nose 336 or a failure of the actuation mechanism. This will be discussed in more detail hereunder. Inner sleeve 314 extends uphole and is illustrated as joined in a threaded connection to upper inner sleeve 352 which provides shifting profiles 354 and 356 for uphole shifting and downhole shifting, respectively in the event of a catastrophic occurrence with respect to the inner sleeve itself or the actuation mechanism. Lower sleeve 314 and upper sleeve 352 in combination are secured to drive sleeve 360 by dogs 362 which are maintained in the engaged position by shear out sleeve 364. This shear out sleeve is identical to that described earlier and a balance of the operative elements of shear out sleeve 364 are numeraled identically to shear out sleeve 318. Thus, shear out sleeve 364 includes snap ring 320, groove 322, set slot 324 and shear screw 326 as well as shifting profile 328. Drive sleeve 360 is threaded on its O.D. at at least the uphole most portion thereof wherein drive sleeve 360 is engaged with a drive screw 366. In order to transfer power more effectively, thrust bearings 368 are employed and are maintained in their desired positions by bearing retainers 370. Drive force is transferred to drive screw 366 through drive shaft 372 which is supported at its downhole end by bearings 374 and includes a spur gear arrangement 376 at the downhole end thereof which is complimentary to a spur gear arrangement on the O.D. of drive screw 366. From drive shaft 372 uphole, the nose seal drive mechanism is identical to the dependent sleeve choke mechanism and therefore, is not illustrated or described in detail at this point.

In operation, the nose seal choke mechanism provides several modes of operation Initially and preferentially, the electronics housing (not shown) includes downhole processors and power conduits or power supplies to determine through preprogrammed instructions or based upon input from sensors such as linear potentiometers, linear voltage display transducers, resolvers or synchros as well as flow sensors, pressure sensors, temperature sensors and other sensors downhole whether the flow should be increased or decreased. Upon such determination, the electronics of the device will cause the motor to turn the drive shaft in the desired direction to either move the nose seal uphole or downhole thus opening or closing ports 334 to the desired extent. Since nose 336 is either composed of or coated with a hard substance such as tungsten carbide, longevity of the nose should be substantial. However, in the event that the nose should become dislodged or worn away, the shear out sleeves 364 and 318 can be sheared as described above by a conventional shearing tool to allow the downstop and dog retainers sleeves to slide downhole thereby allowing the inner sleeve to slide downhole exposing previously unused port 342 to port 334. After such occurrence the inner sleeve 314 can be actuated mechanically in a conventional manner with a shifting tool bearing on shifting profiles 354 or 356 to align or misalign port 342 or port 334 to varying degrees.

In another mode of operation, only shear out sleeve 364 would be removed which would disconnect a malfunctioning motor drive system from the inner sleeve and allow the shifting tool to operate the nose seal in the originally intended manner. This allows the operator of the well to shift the nose seal choke mechanism mechanically with a shifting tool for an extended period of time even after failure of the drive actuation system. Moreover, if over time, in this mode of operation, the nose seal is worn away, the operator can shear the shear sleeve 318 and gain an entirely new method of operation of the tool by allowing port 342 to align with port 334. Thus longevity of the tool is significant. The shear out possibilities with this tool helps prevent the need for removing the tool from its downhole position for an extended period of time.

In the helical key choke mechanism embodiment of the invention, referring to FIGS. 28–36, a very similar drive mechanism is provided as those described hereinabove, however the flow controlling features are distinct. More specifically, the invention contains an upper key body and lower key body having helical grooves therein and being adapted to receive removable keys which when extended into a helical groove, choke flow through the tool. In the most preferred embodiment, the choking position of the tool moves keys from the upper section and lower section toward one another and this action is created by a single moving sleeve. The sleeve moves downhole to close the helical flow areas and forces the upper keys downhole with it while it turns a spur gear at the downhole end which forces the lower keys uphole while the sleeve is moving downhole.

Figure 34:
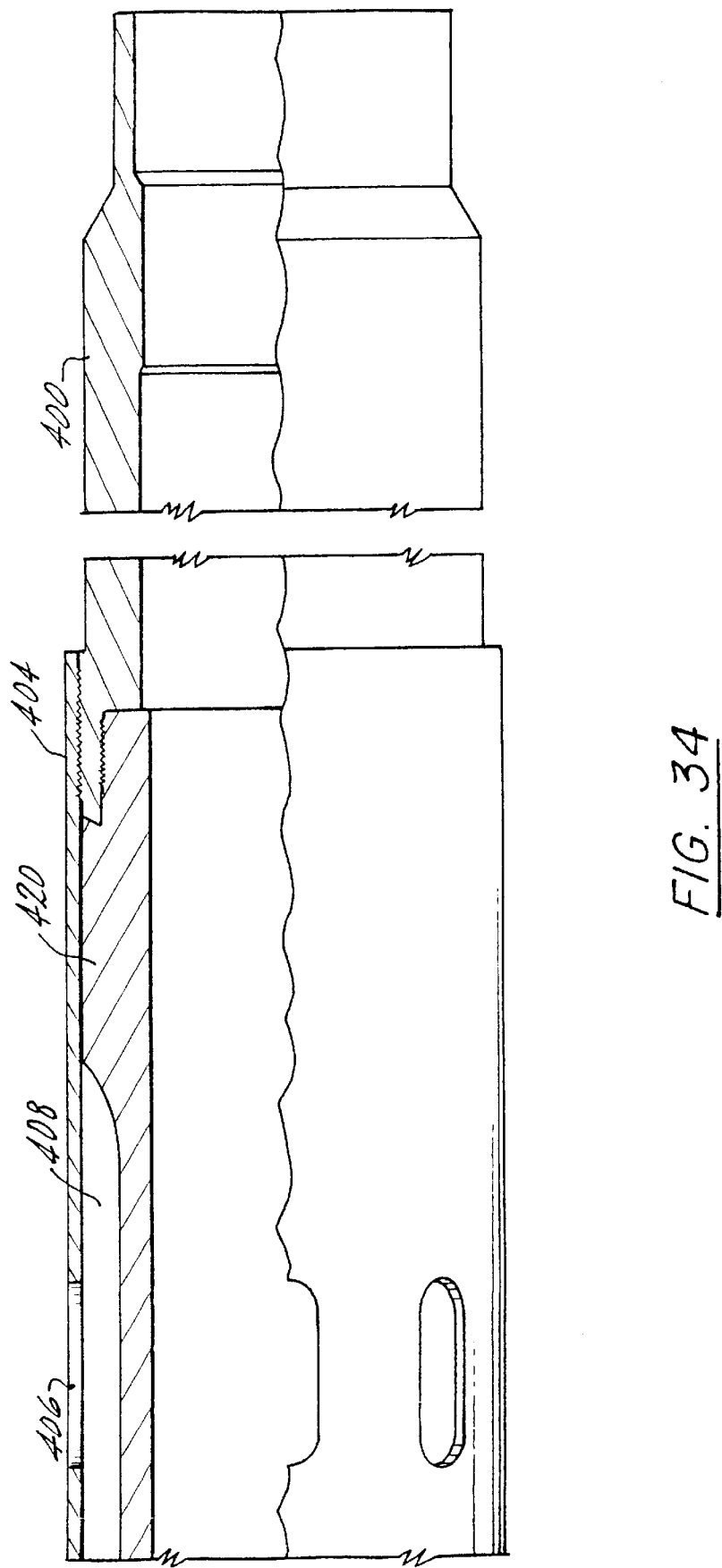

Beginning with the downhole end of the tool, at FIG. 34, lower sub 400 is threadedly connected to the lower key body 420 and outer housing 404. Outer housing 404 contains a plurality of lower ports 406 which allow fluid to flow into lower flow area 408. The outer housing also includes upper ports 410 which allow fluid to flow into upper flow area 412. Flow areas 408 and 412 are communicatively connected to the helical flow paths 416 and 418 illustrated in FIG. 35.

Figure 30:
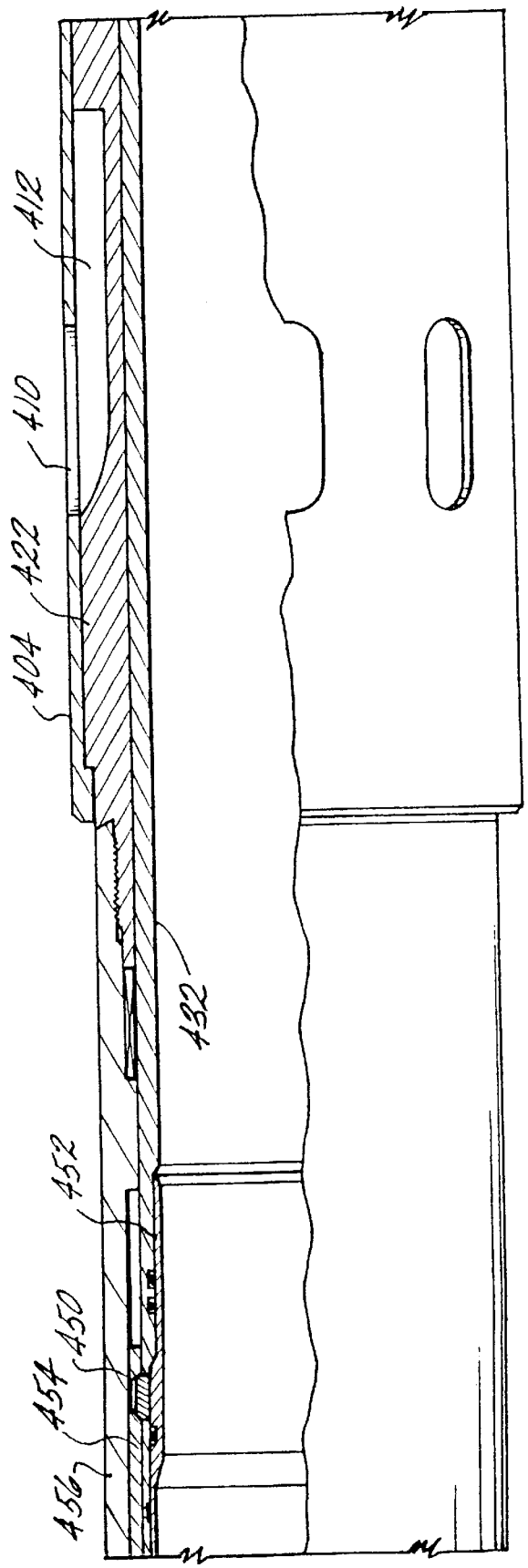
Figure 31A:
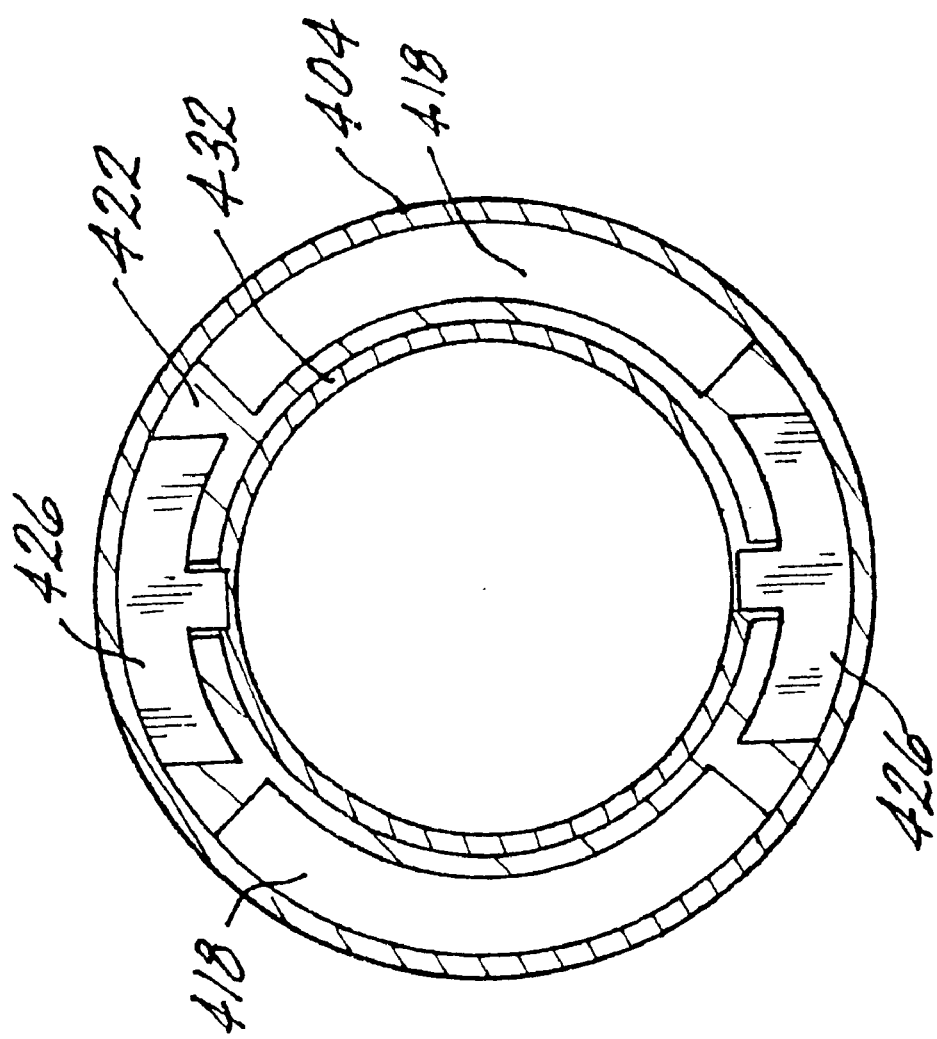
FIG. 31A is a cross-section view of the invention depicted in FIGS. 28–34 taken along section lines of the same number, letter combination.
Figure 32:
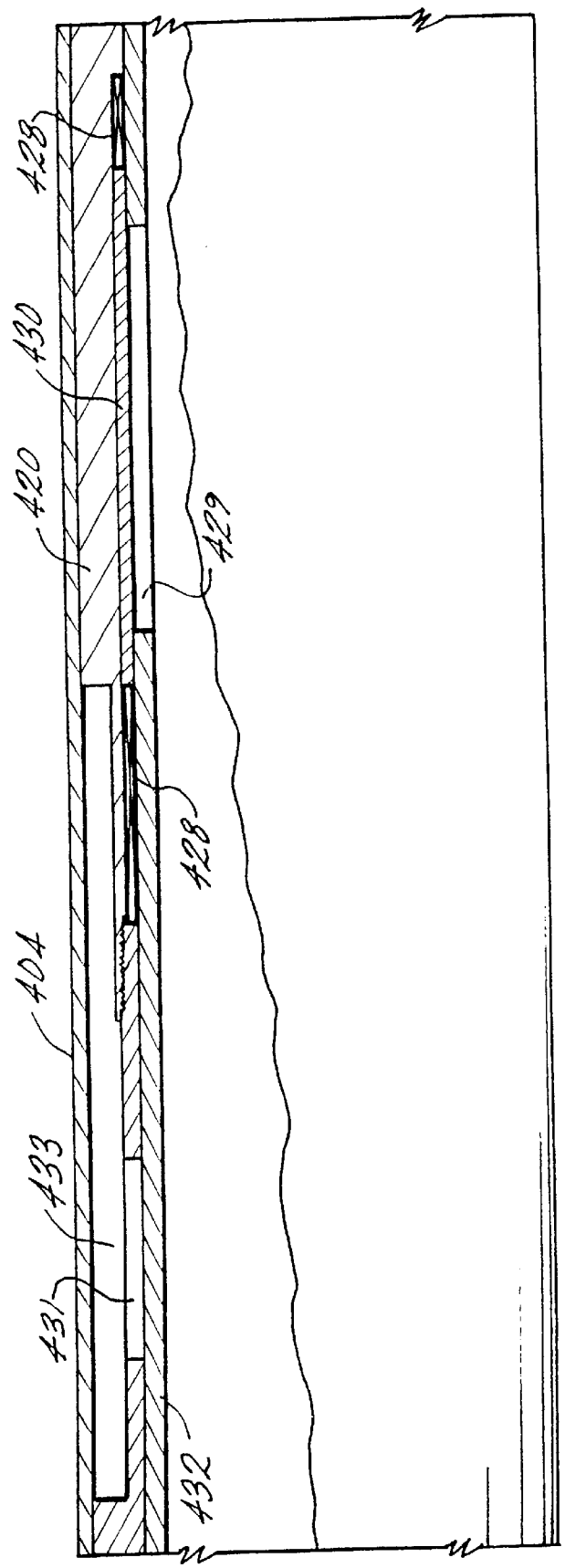
Figure 33:
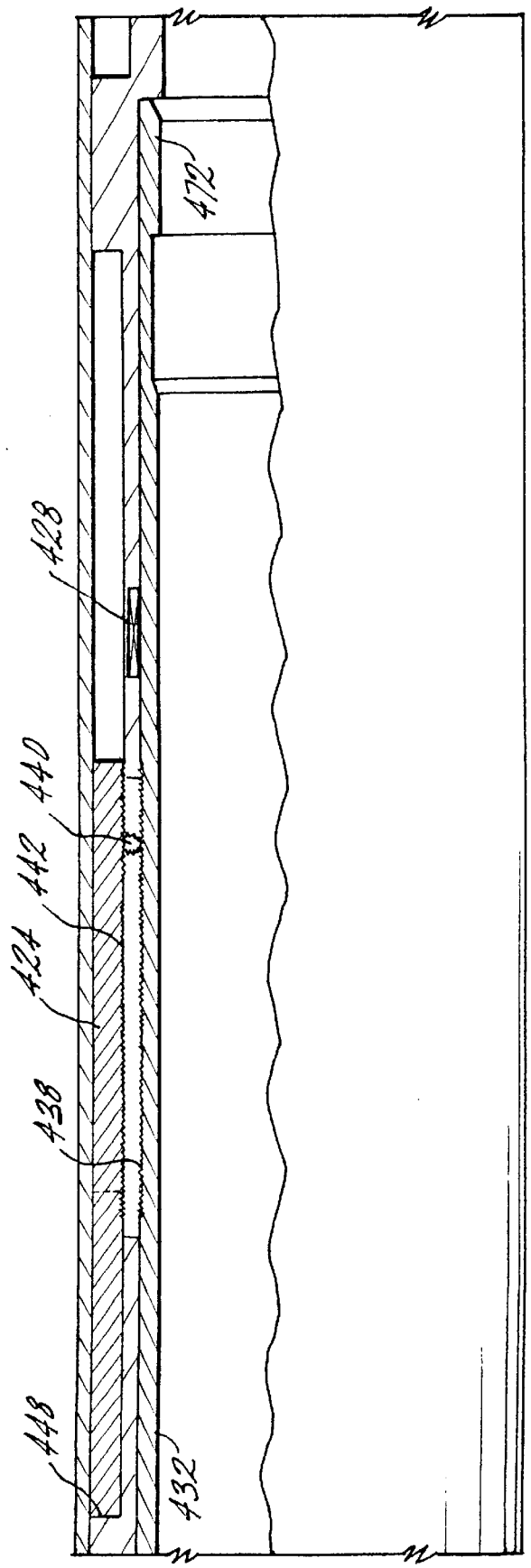
Figure 35:
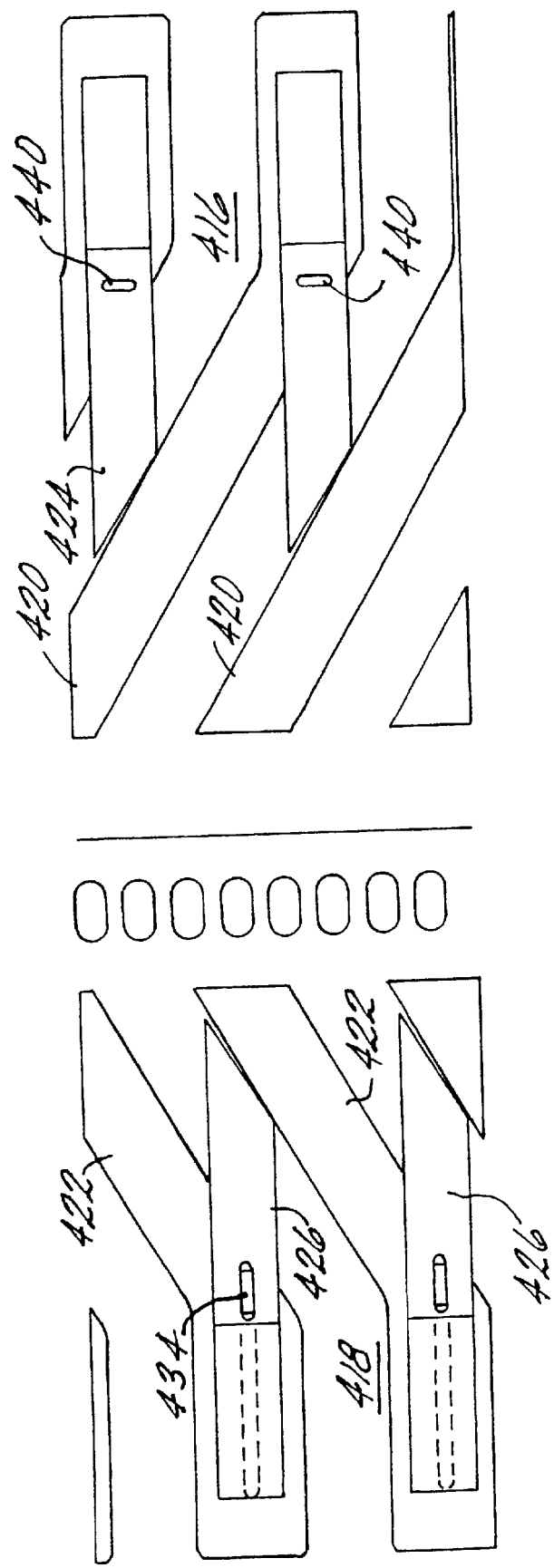
FIG. 35 is a plan view of the helical grooves and keys of the invention depicted in FIGS. 28–34 the pipe having been separated and laid flat.
Figure 36:
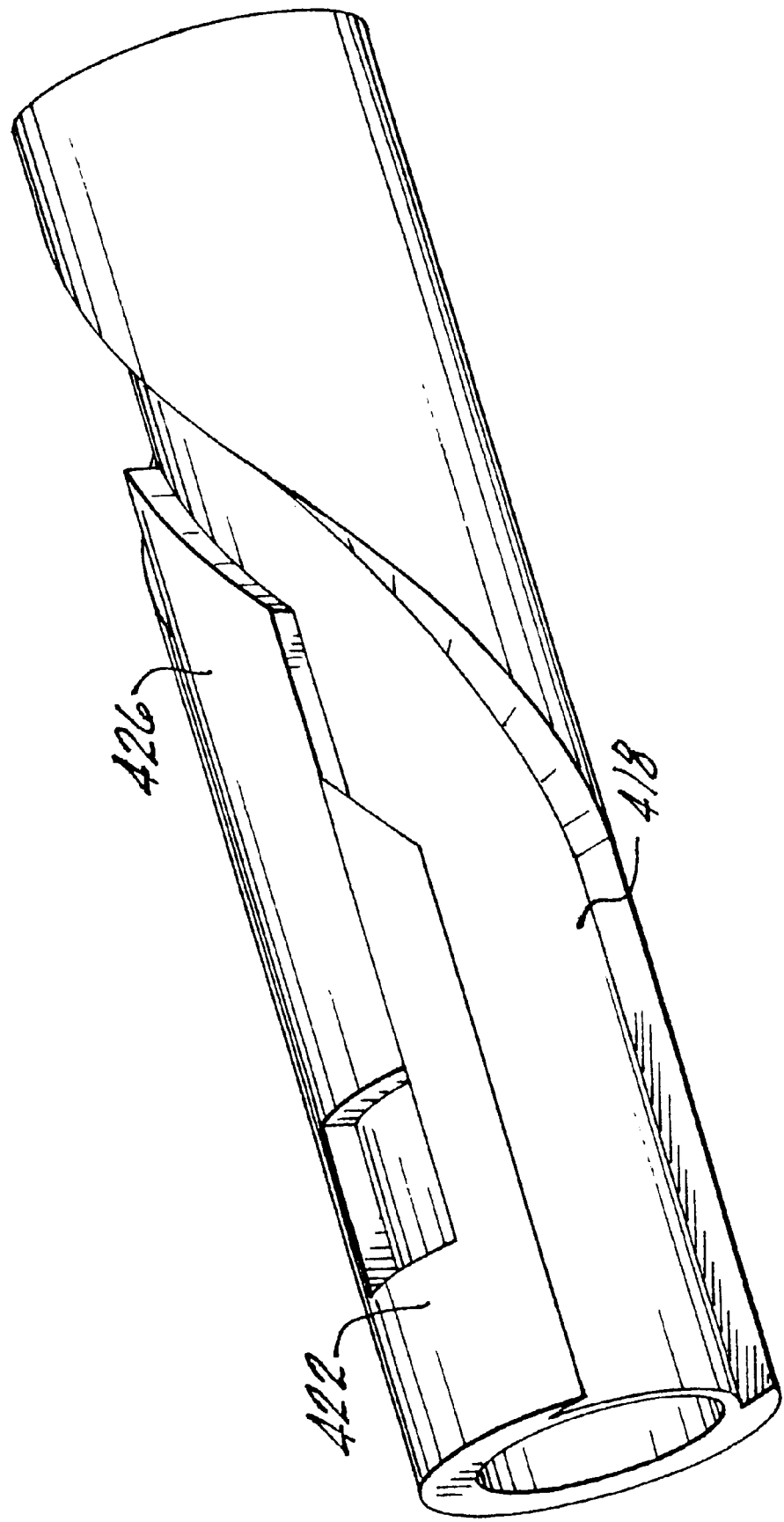
FIG. 36 is a perspective view at the same section of the invention of FIGS. 28–34.
Figure 37:
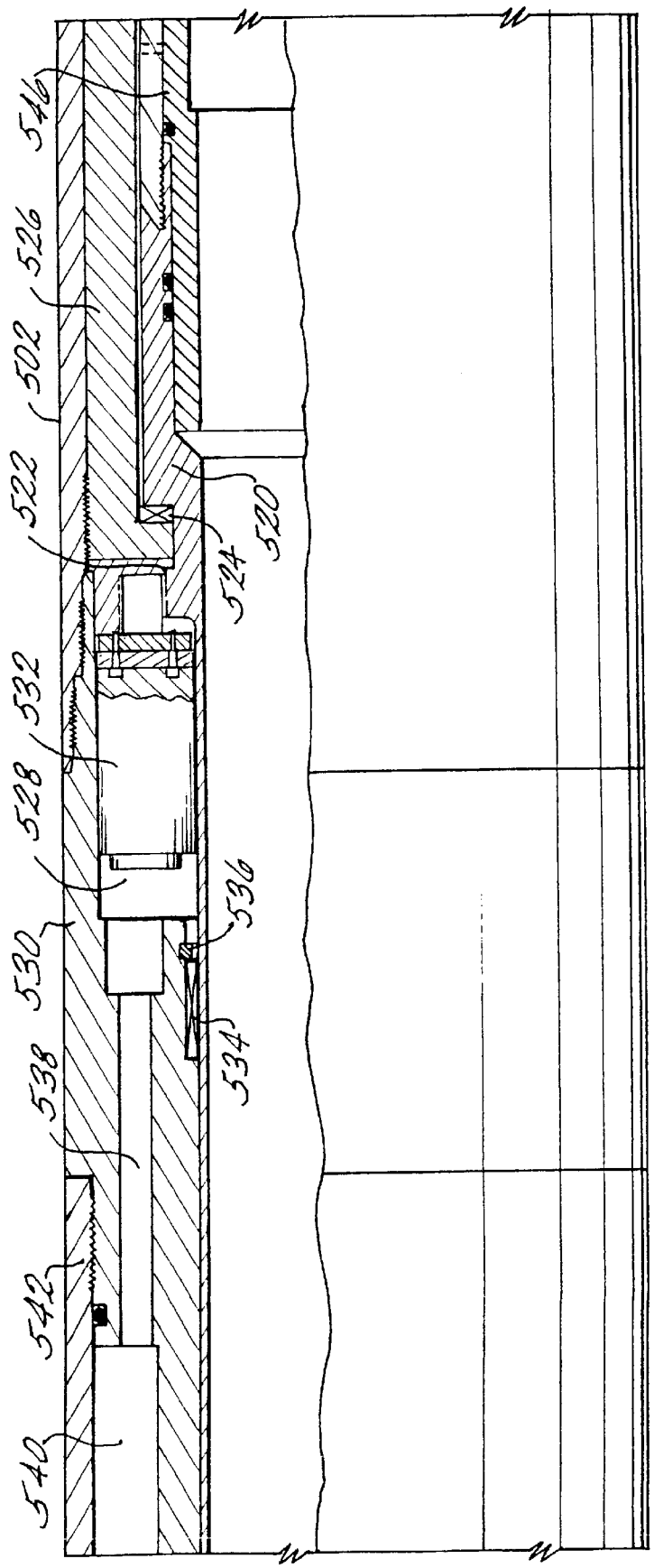

Radially inwardly of outer housing 404 are disposed lower key body 420 and upper key body 422 which are visible both in section view in FIGS. 30–32 and in plan view in FIG. 35. These key bodies provide the helical flow paths to enable the choking action desired by the invention by moving the lower keys 424 and upper keys 426. Preventing flow into undesired areas are seals 428 which maintain position by seal retainer 430. Upward movement of sleeve 432 opens flow through the helical flow path 416 and 418 by moving keys 424 and 426 increasing the flow area at the keys. Movement of sleeve 432 also moves ports 429 in alignment with ports 431 in the upper key body 418. Fluid from the helical flow paths 416 and 418 enter a plenum chamber 433 and commingle reducing their kinetic energy. Fluid is then redirected through the ports 429 in sleeve 432 into the tubing. Continuing to concentrate on FIGS. 30–33, inner sleeve 432 extends through each of the identified drawings to actuate both lower keys 424 and upper keys 426. A longitudinal movement of inner sleeve 432 moves upper keys 426 through the urging on projection 434 of inner sleeve 432. Projection 434 is received in slot 436 of inner sleeve 432 to provide positive engagement thereof. Lower key 424 is likewise moved by inner sleeve 432 but in a direction opposite that of upper keys 426. The movement is proportional in magnitude but opposite indirection. The action described is created by providing spur teeth 438 on the O.D. of inner sleeve 432 at the appropriate location to engage spur gear 440 which translates energy inputted by the inner sleeve 432 to lower key 424 through rack teeth 442 on the I.D. of keys 424. The helix key choke mechanism embodiment of the invention is illustrated in the drawings in the closed, fully choked position; as will be appreciated by one of ordinary skill in the art, from the lack of a gap at the location indicated as 446 for the upper keys and 448 for the lower keys. In drawing FIGS. 29 and 30 dog 450 is readily apparent which is held in place by shear sleeve 452 which has been described hereinabove and will not be described now. Dog 450 locks inner sleeve 432 to drive sleeve 454 which is housed in connector housing 456. Drive sleeve 454 extends uphole into communication with drive screw 458 which employs thrust bearings 460 and bearing retainers 462 as discussed hereinabove. In the event of a failure of the motor actuation of this tool, shear sleeve 452 will be utilized as above described to release inner sleeve 432 from drive sleeve 454 whereafter profiles 470 at the uphole end of the tool and 472 at the lower end of the tool may be employed via a conventional shifting tool to actuate the helix key choke mechanism of the invention.

Referring to FIGS. 37–41, the spiral choke mechanism embodiment of the invention is illustrated the spiral choke mechanism includes a housing having a longitudinal port and a rotatable spiral choke within the housing such that flow can be stopped or choked to a desired extent. The spiral choking insert includes a longitudinal port to allow flow to the I.D. of the tubing.

Figure 39A:
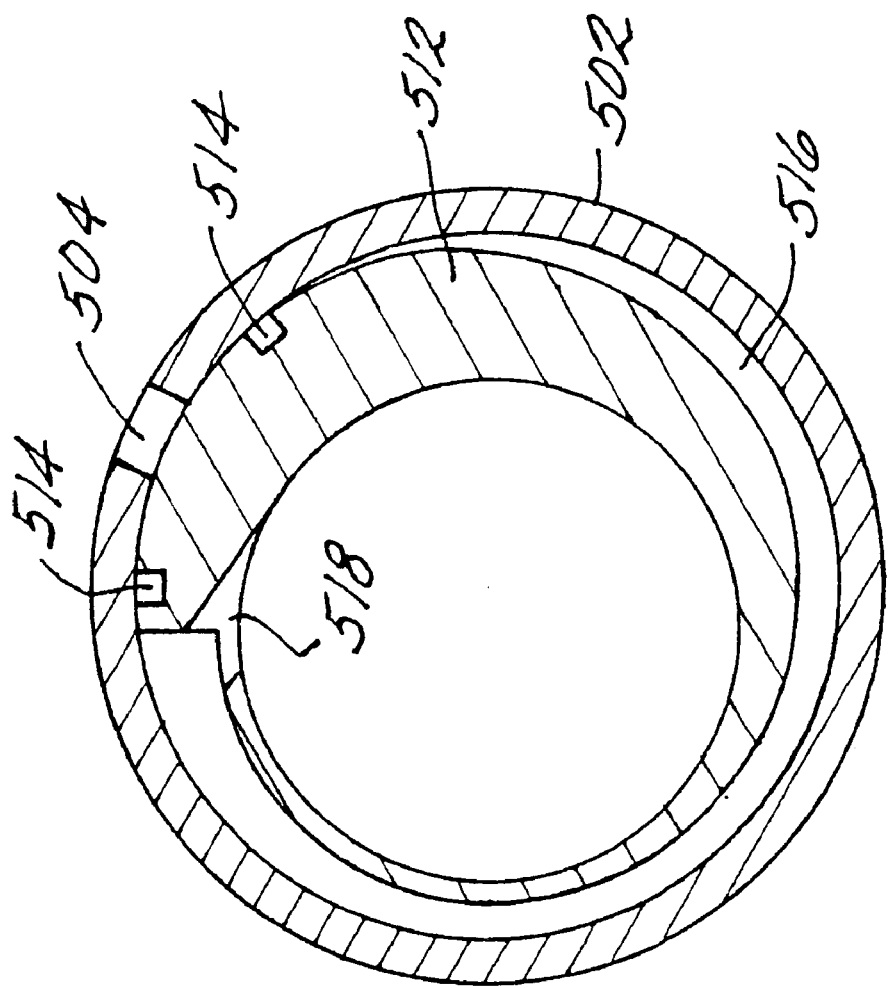
FIG. 39A is a cross-section of the embodiment illustrated in FIGS. 37–41 taken along section lines of the same number, letter combination.
Figure 40:
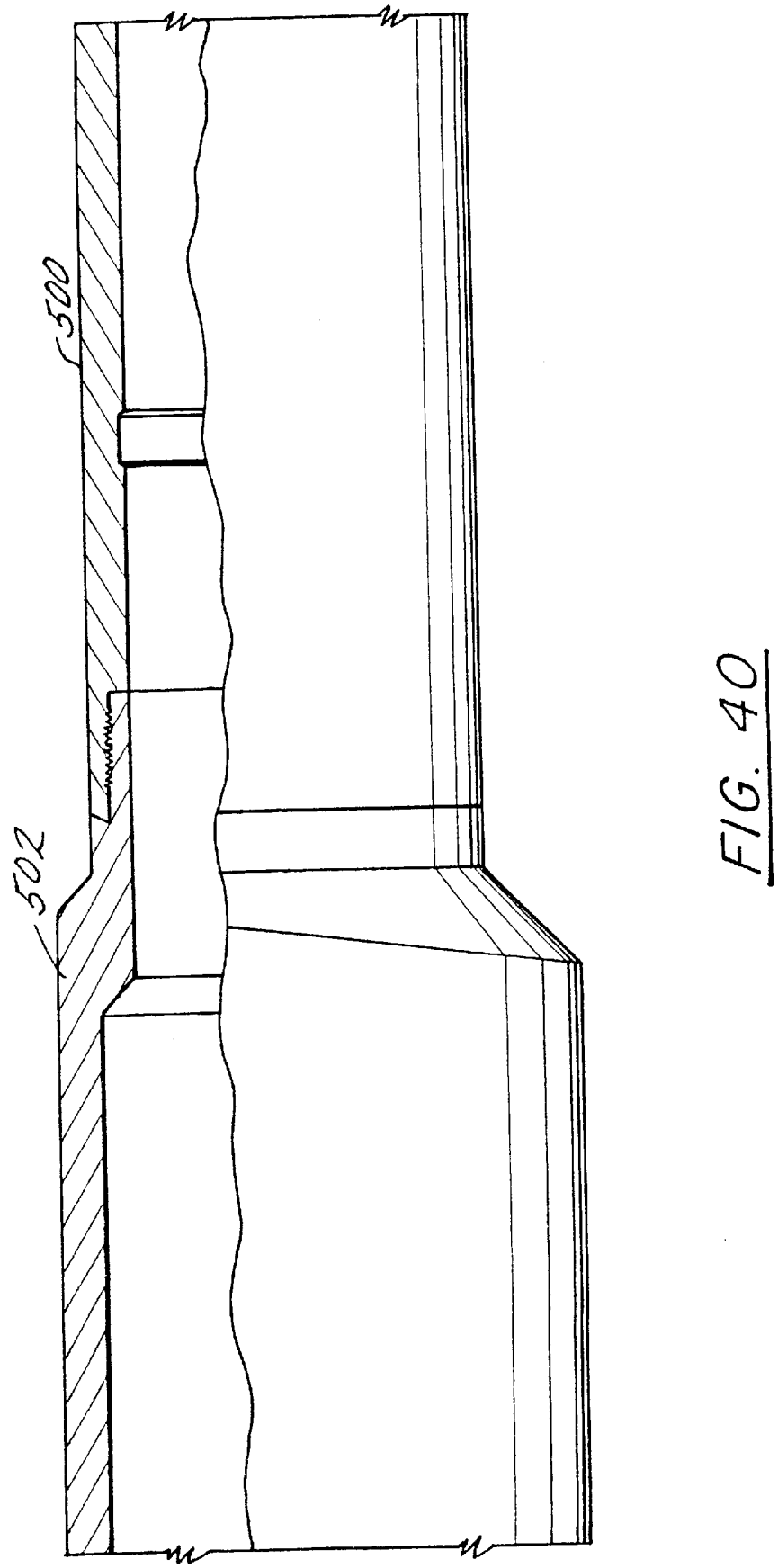
Figure 41:
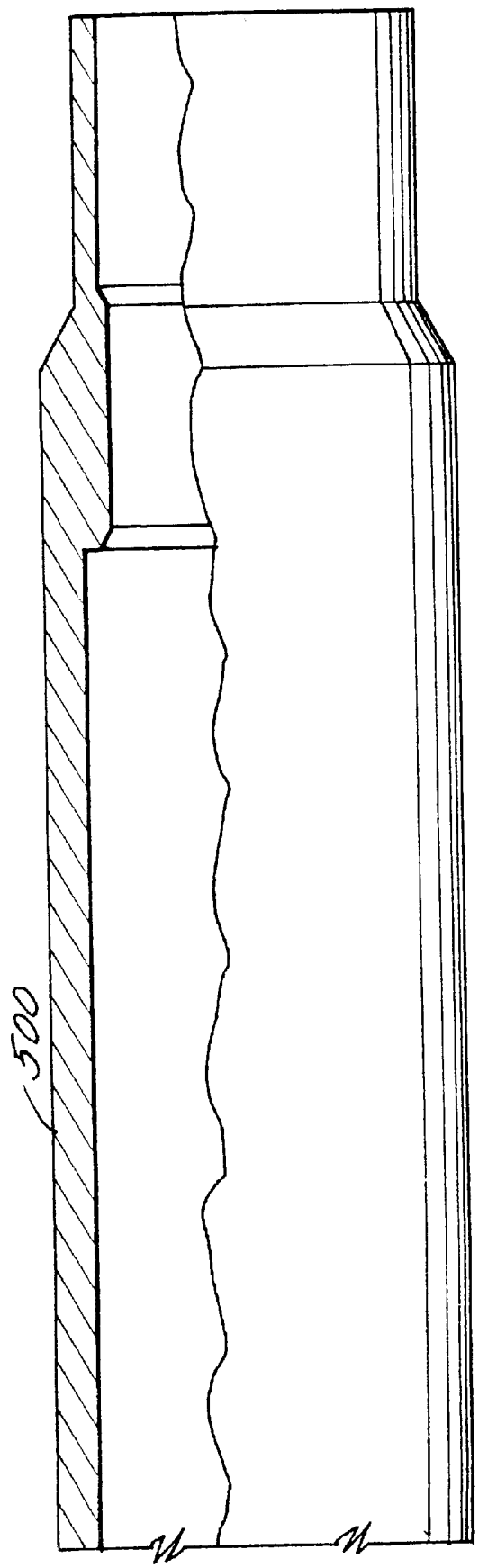
Figure 42:
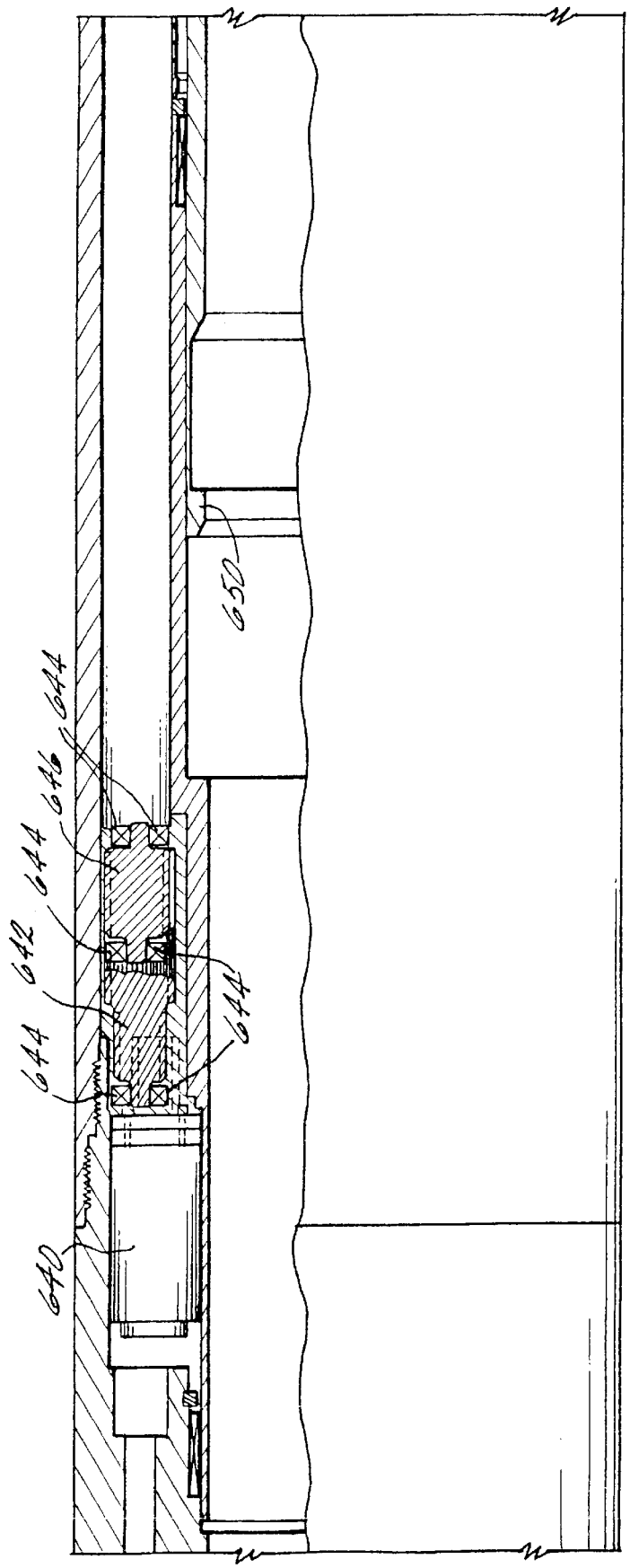
Figure 43:
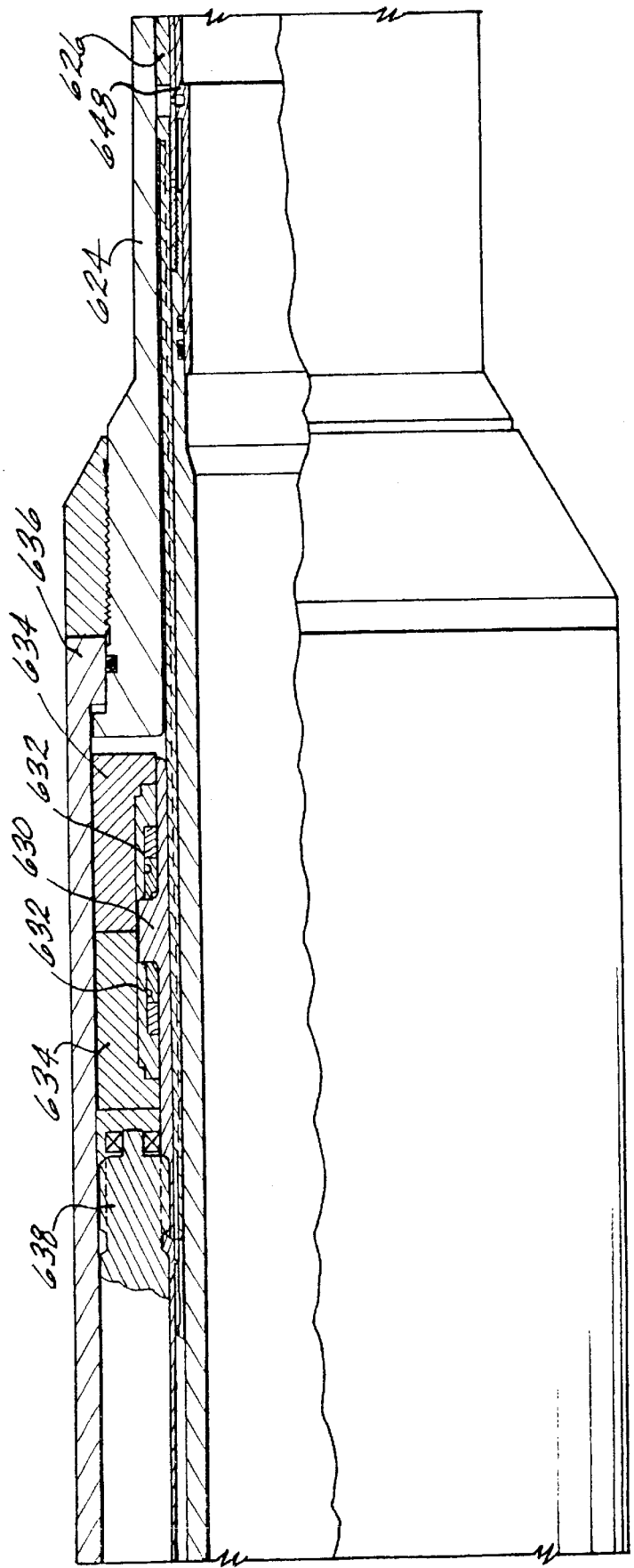
Figure 44:
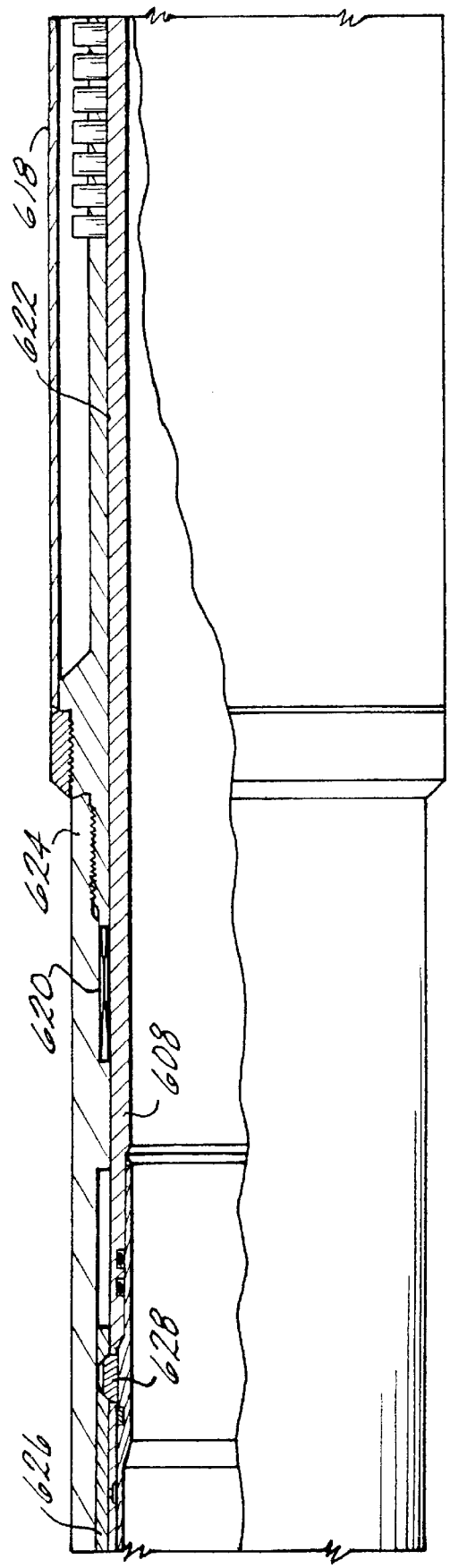
Figure 46:
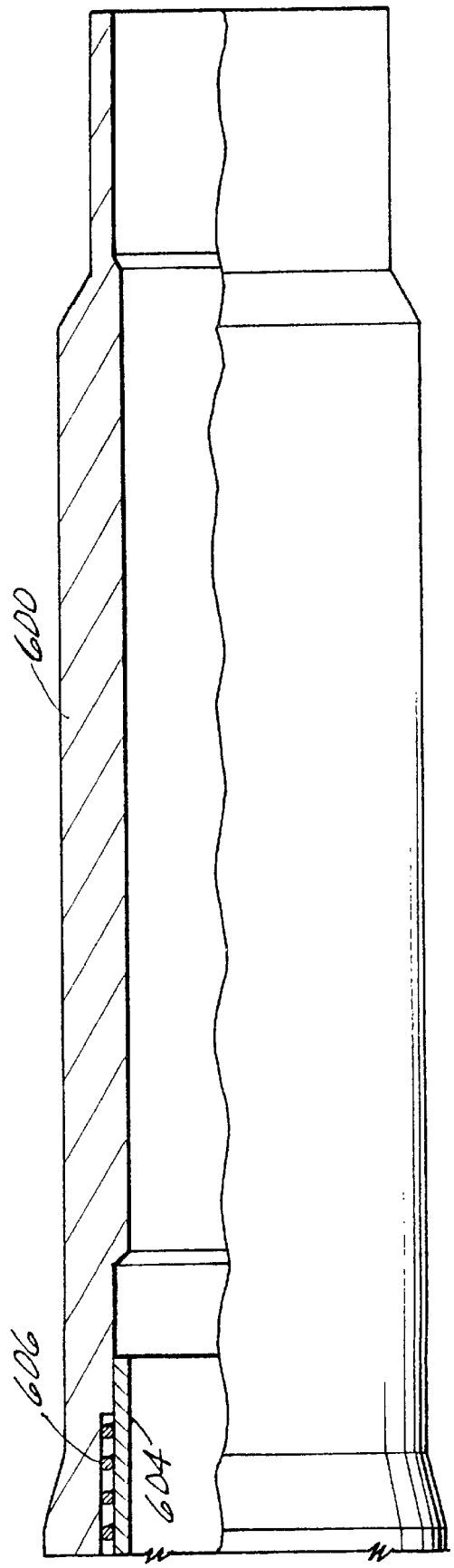

Beginning from the downhole end of the tool, at FIG. 41 and moving uphole (or backward in drawing figure numbers) lower sub 500 extends uphole to mate with ported housing 502 which provides a longitudinal port illustrated in FIG. 39a said port being indicated as 504. The ported housing extends uphole to terminate at motor housing 530. Other features of ported housing 502 are seals 506 which are disposed on uphole and downhole ends of the flow choking section of inner sleeve 512. Ported housing 502 further includes snap ring receiving groove 508 which will be employed only if the drive mechanisms of the tool fails. This will be discussed hereunder. Radially inwardly of ported housing 502 is inner sleeve 512 as mentioned above. Initially 512 is best viewed in the cross section view of FIG. 39a which provides an understanding to one of skill in the art of the gradually increasing flow area between ported housing 502 and inner sleeve 512. As one of skill in the art will understand, as sleeve 512 is rotated in the counterclockwise direction flow though port 504 is increased. When the choke sleeve 512 is in the closed position, seals 514 are positioned on either side of port 504 and prevent any flow between the well annulus and the tubing. When the choke is open flow will be carried through flow area 516 until the flow reaches port 518 and flows into the tubing itself.

Sleeve 512 is rotably actuated by motor 532 which drives upper sleeve 520 through ring gear profile 522 in order to create smooth power flow. Thrust bearings 524 are located as indicated and are all retained by thrust bearing retainer 526. The motor is surrounded as in previous embodiments by dielectric fluid occupying the space indicated as 528 and sealed from wellbore fluid by seal 534 which is held in place by snap ring 536. Fluid compensators are also preferably employed. Motor housing 530 provides power conduit 538 which connects to electronics area 540 covered by electronics housing cover 542.

Figure 38:
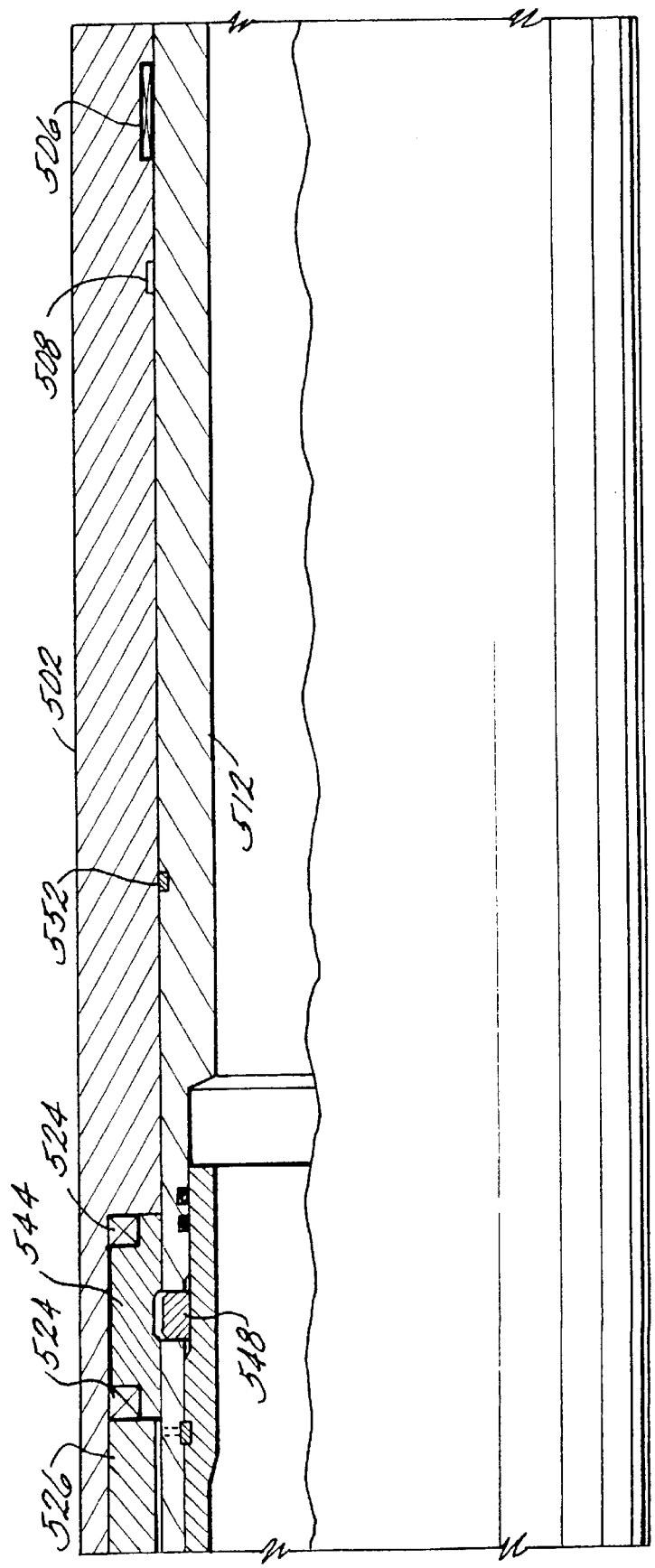

Referring to FIG. 38 the dog retainer 544, it will be understood, rotates easily due to reduced friction rotatably due to thrust bearings 524 while still maintaining the inner sleeve 512 in communication with the motor drive.

In the event of a failure of the invention, provision is made for closing off a choke mechanism but not for operating the choke mechanism subsequent to shearing. Upon the occurrence of such a failure shear sleeve 546 is actuated as described in more detail with respect to the embodiments above. Subsequent to dog 548 disengaging from dog retainer 544 the shifting tool (not shown) is employed upon shifting profile 550 to force inner sleeve 512 downhole misaligning a spiral choking element of that sleeve from the longitudinal port 504 to permanently close the flow control device. In order to ensure that the device will not self open, snap ring 552, upon moving of sleeve 512 downhole, will expand into snap ring receiving groove 508 and will prevent relative movement of sleeve 512 and ported housing 502.

In a final embodiment of the invention, an orifice choke mechanism is disclosed. Referring to FIGS. 42–46, the orifice choke is illustrated in cross-section which embodiment provides a plurality of orifices constructed of an erosion resistant material and which can be exposed from the inside of the tubing by an inner sleeve. This tool as in the foregoing embodiments is preferably actuated by a downhole motor drive system including an electronics package having a processor and sensor capability. Referring directly to the drawings and the downhole end of the tool (FIG. 46) a lower sub 600 extends uphole to threadedly mate with orifice housing 602. It should be noted that lower sub 600 provides stacked radial recesses on the I.D. thereof to receive elements of the invention. The first recess allows seal cover 604 to slide along the I.D. of lower sub 600 while not restricting the overall I.D. of the tubing string. The second recess accepts spring 606 which biases seal cover 604 to the uphole position when inner sleeve 608 is moved uphole to expose any number of the plurality of orifices 610. The purpose of seal cover 604 and spring 606 is to maintain uphole end 612 of seal cover 604 in contact with shifting profile 614 of inner sleeve 608 so that when inner sleeve 608 moves uphole due to the impetus of either the motor drive system of the invention or the backup conventional shifting tool system, the seal cover 604 will cover seal 616 and prevent flow cutting thereof. The operative area of the flow control device further includes a screen 618 to protect the plurality of orifices during run in the hole and to prevent debris from collecting at the orifices and reducing the flow thereof. As one of skill in the art will appreciate each orifice is extended beyond flush with orifice housing 602 this is to provide room for erosion of the orifices without causing any damage to the device. It should also be noted that the orifices are squared off to provide a pressure drop therethrough thus enhancing the operability of the tool. The orifices themselves are most preferably constructed of tungsten carbide or other similar highly erosion resistant material to provide for longevity of the tool.

Orifice housing 602 includes seals 616, noted above, and seal 620 to provide effective seal of the device and stop flow should such action be determined necessary or desirable. It is, otherwise, noted that numeral 622 points out that there is a gap between the inner sleeve 608 and the orifice housing 602 on the order of one to several thousandths of an inch. This provides for a very small amount of flow from the uphole orifices when only lower hole orifices are exposed by uphole movement of the inner sleeve 608. Orifice housing 602 is threadedly connected to housing connector 624 which is, in turn, connected to a gear housing and uphole components. Radially inwardly of housing connector 624, one of skill in the art having been exposed to the foregoing embodiments will recognize drive sleeve 626 which is locked to inner sleeve 608 through the inner media are of dog 628 the dog is held in place with a shear release sleeve which has been hereinbefore described and will not be described at this point. Drive sleeve 626 extends upwardly to threadedly mesh with drive screw 630 in a manner hereinbefore described. Drive screw 630 also includes thrust bearing 632 and bearing retainers 634 which are outwardly bounded by gear housing 636. Screw 630 is driven by drive shaft 638 and motor 640. The motor transmits power through a spur gear 642 supported by bearings 644 and a second gear 646 also supported by bearings 644. Power is supplied to the motor and downhole control exists in the same manner as previously described with the foregoing embodiments. In the event of a failure of the motor drive system of the invention, the shear out sleeve 648 is actuated releasing dog 628 from drive sleeve 626 whereafter a conventional shifting tool is employed on shifting profile 650 or 614 to open or close the choke mechanism respectively.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A downhole choke mechanism comprising:
   a) a ported housing having at least one housing port, said housing having an inside diameter and an outside diameter;
   b) an inner sleeve slideable along the inside diameter of said ported housing;
   c) a choke sleeve slidable along the outside diameter of said ported housing, said inner sleeve and said outer sleeve being fixed to one another;
   d) a drive system capable of variably moving said choke mechanism whereby flow of fluid through said at least one port is variably controlled.

2. A downhole choke mechanism as claimed in claim 1 wherein said inner sleeve further includes at least one sleeve port selectively and variably alienable with said at least one housing port.

3. A downhole choke mechanism as claimed in claim 2 wherein said drive system includes a motor drive and a gear train.

4. A downhole choke mechanism as claimed in claim 3 wherein said motor drive is selected from the group consisting of electric, hydraulic and pneumatic.

5. A downhole choke mechanism as claimed in claim 3 wherein said gear train includes at least one spur/helical screw thread sleeve.

6. A downhole choke mechanism as claimed in claim 2 wherein said choke sleeve is longer than said inner sleeve to promote choking of fluid flow and to provide protection for said at least one sleeve port.

7. A downhole choke mechanism as claimed in claim 6 wherein said choke sleeve employs a hard material to reduce erosion thereof.

8. A downhole choke mechanism as claimed in claim 7 wherein said hard material is tungsten carbide.

9. A downhole choke mechanism as claimed in claim 1 wherein said mechanism includes a downhole computer control system.

10. A downhole choke mechanism as claimed in claim 9 wherein said computer control system includes a downhole processor and at least one sensor.

11. A downhole choke mechanism as claimed in claim 10 wherein said at least one sensor is a plurality of sensors.

12. A downhole choke mechanism as claimed in claim 11 wherein said at least one sensor is a position sensor.

13. A downhole choke mechanism as claimed in claim 12 wherein said position sensor is selected from the group consisting of linear potentiometers, LVDT sensors, resolvers and synchros.

14. A downhole choke mechanism as claimed in claim 10 wherein said plurality of sensors includes pressure sensors, flow sensors, temperature sensors, position sensors and water cut sensors.

15. A downhole choke mechanism as claimed in claim 1 wherein said mechanism further includes a shear out assembly to release said drive system from said sleeves whereby said sleeves are manually operable.

16. A choke mechanism comprising:
a) a ported housing having an I.D. and an O.D., said housing having at least one housing port;
b) a choke sleeve disposed against the O.D. of said ported housing;
c) an inner sleeve disposed against the I.D. of said ported housing, said inner sleeve being moveable independently of said outer sleeve;
d) a drive system including two gear trains, a first connected at a first end to at least one driver and at a second end to an inner sleeve and a second gear train connected at a first end to said at least one driver and at a second end to the choke sleeve.

17. A choke mechanism as claimed in claim 16 wherein said drive system further includes a solenoid clutchable between said two gear trains to connect one or the other to said at least one driver.

18. A choke mechanism as claimed in claim 16 wherein said inner sleeve further includes at least one sleeve port selectively and variably alienable with said at least one housing port.

19. A choke mechanism as claimed in claim 16 wherein said motor drive is selected from the group consisting of electric, hydraulic and pneumatic.

20. A choke mechanism as claimed in claim 16 wherein said gear train includes at least one spur/helical screw thread sleeve.

21. A choke mechanism as claimed in claim 16 wherein said choke sleeve employs a hard material to reduce erosion thereof.

22. A choke mechanism as claimed in claim 21 wherein said hard material is tungsten carbide.

23. A choke mechanism as claimed in claim 16 wherein said mechanism includes a downhole computer control system.

24. A choke mechanism as claimed in claim 23 wherein said computer control system includes a downhole processor and at least one sensor.

25. A choke mechanism as claimed in claim 24 wherein said at least one sensor is a plurality of sensors.

26. A choke mechanism as claimed in claim 24 wherein said at least one sensor is a position sensor.

27. A choke mechanism as claimed in claim 26 wherein said position sensor is selected from the group consisting of linear potentiometers, LVDT sensors, resolvers and synchros.

28. A choke mechanism as claimed in claim 24 wherein said mechanism further includes a shear out assembly to release said drive system from said sleeves whereby said sleeves are manually operable.

29. A choke mechanism as claimed in claim 16 wherein said mechanism further includes a shear out assembly to release said drive system from said sleeves whereby said sleeves are manually operable.

* * * * *